(12) United States Patent
Thanos et al.

(10) Patent No.: US 12,515,028 B2
(45) Date of Patent: Jan. 6, 2026

(54) MULTICOMPARTMENT MACROENCAPSULATION DEVICES

(71) Applicant: Vertex Pharmaceuticals Incorporated, Boston, MA (US)

(72) Inventors: Christopher Thanos, Cumberland, RI (US); John Mills, Warwick, RI (US); Megan Billings, Warwick, RI (US)

(73) Assignee: Vertex Pharmaceuticals Incorporated, Boston, MA (US)

( * ) Notice: Subject to any disclaimer, the term of this patent is extended or adjusted under 35 U.S.C. 154(b) by 847 days.

(21) Appl. No.: 17/600,672

(22) PCT Filed: Apr. 2, 2020

(86) PCT No.: PCT/US2020/026437
§ 371 (c)(1),
(2) Date: Oct. 1, 2021

(87) PCT Pub. No.: WO2020/206157
PCT Pub. Date: Oct. 8, 2020

(65) Prior Publication Data
US 2022/0143374 A1     May 12, 2022

Related U.S. Application Data

(60) Provisional application No. 62/828,915, filed on Apr. 3, 2019.

(51) Int. Cl.
*A61M 31/00*     (2006.01)
*A61F 2/02*     (2006.01)
(Continued)

(52) U.S. Cl.
CPC ........... *A61M 31/002* (2013.01); *A61F 2/022* (2013.01); *A61K 9/0024* (2013.01); *A61K 35/39* (2013.01);
(Continued)

(58) Field of Classification Search
CPC ............ A61M 31/002; A61M 2205/04; A61M 2207/00; B01D 2325/0283; B01D 69/02;
(Continued)

(56) References Cited

U.S. PATENT DOCUMENTS 5,182,111 A * 1/1993 Aebischer ............... A61K 35/30
435/177
5,262,055 A    11/1993 Bae et al.
(Continued)

FOREIGN PATENT DOCUMENTS

JP     H08-504615 A     5/1996
JP     H08-507950 A     8/1996
(Continued)

OTHER PUBLICATIONS

[No Author Listed], Vertex to Acquire ViaCyte, With the Goal of Accelerating its Potentially Curative VX-880 Programs in Type 1 Diabetes. Business Wire. Jul. 1, 20221. Accessible from <https://www.businesswire.com/news/home/20220711005280/en/> 2 pages.
(Continued)

*Primary Examiner* — Theodore J Stigell
(74) *Attorney, Agent, or Firm* — Wolf, Greenfield & Sacks, P.C.

(57) ABSTRACT

Macroencapsulation devices and their methods of use are disclosed. In one embodiment, a macroencapsulation device may include a first outer membrane, a second outer membrane, and at least one semipermeable membrane disposed there between to form at least a primary compartment configured to house a first population of cells and a secondary compartment in fluid communication with the primary compartment through the first semipermeable membrane. In some embodiments, the flow of material into and out of the compartments of the macroencapsulation device and/or the application of an appropriate pressure differential between
(Continued)

the compartments may be used to control the flow of filtrates, ancillary agents, and other materials between the compartments of the device when positioned in vivo.

29 Claims, 10 Drawing Sheets

(51) Int. Cl.
*A61K 9/00* (2006.01)
*A61K 35/39* (2015.01)
*B01D 69/02* (2006.01)
*C12N 5/071* (2010.01)

(52) U.S. Cl.
CPC ........... *B01D 69/02* (2013.01); *C12N 5/0676* (2013.01); *A61M 2205/04* (2013.01); *A61M 2207/00* (2013.01); *B01D 2325/0283* (2022.08)

(58) Field of Classification Search
CPC ....... A61F 2/022; A61K 9/0024; A61K 35/39; C12N 5/0676; A61J 3/07; A61J 3/074
See application file for complete search history.

(56) References Cited

U.S. PATENT DOCUMENTS

| | | |
|---|---|---|
| 5,549,675 A | 8/1996 | Neuenfeldt et al. |
| 9,011,899 B2 | 4/2015 | Hasilo et al. |
| 9,623,177 B2 | 4/2017 | Panotopoulos |
| 9,913,930 B2 | 3/2018 | Martinson et al. |
| 9,950,149 B2 | 4/2018 | Lathuiliere et al. |
| 2011/0054387 A1 | 3/2011 | Stern et al. |
| 2011/0092949 A1 | 4/2011 | Wang |
| 2015/0112247 A1* | 4/2015 | Tempelman ............ A61F 2/022 435/283.1 |
| 2015/0368125 A1 | 12/2015 | Liang et al. |
| 2016/0250262 A1 | 9/2016 | Agulnick et al. |
| 2016/0375221 A1 | 12/2016 | Panotopoulos et al. |
| 2017/0319472 A1 | 11/2017 | Hennemann et al. |
| 2019/0201323 A1 | 7/2019 | Thanos et al. |
| 2022/0175511 A1 | 6/2022 | Thanos et al. |

FOREIGN PATENT DOCUMENTS

| | | |
|---|---|---|
| JP | 2009-506817 A | 2/2009 |
| JP | 2012-508584 A | 4/2012 |
| JP | 2013-503014 A | 1/2013 |
| JP | 2015-524321 A | 8/2015 |
| JP | 2016-516827 A | 6/2016 |
| JP | 2018-083819 A | 5/2018 |
| WO | 2015/048184 A1 | 4/2015 |
| WO | 2018/144098 A1 | 8/2018 |

OTHER PUBLICATIONS

International Search Report and Written Opinion for Application No. PCT/US2020/026437, mailed Jul. 20, 2020.

Barkai et al., Survival of encapsulated islets: More than a membrane story. World J Transplant. Mar. 24, 2016;6(1):69-90. doi: 10.5500/wjt.v6.i1.69.

* cited by examiner

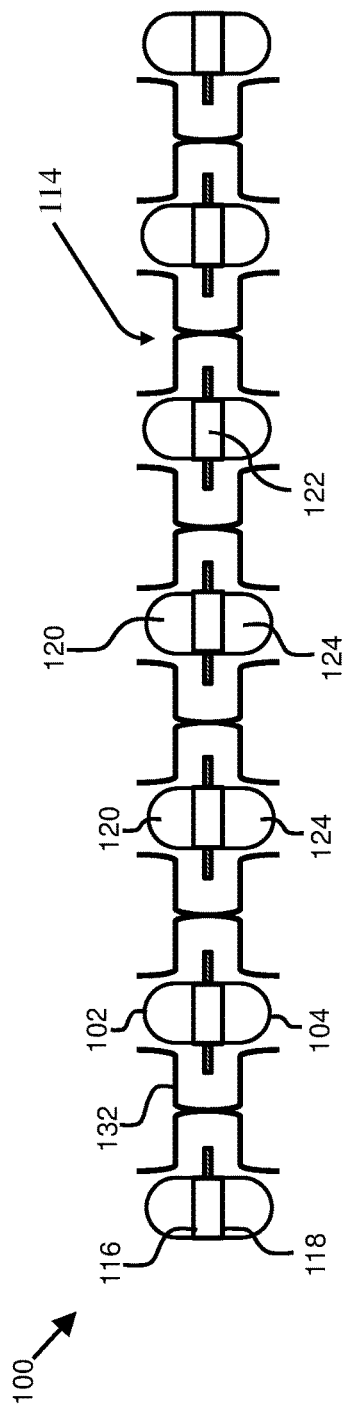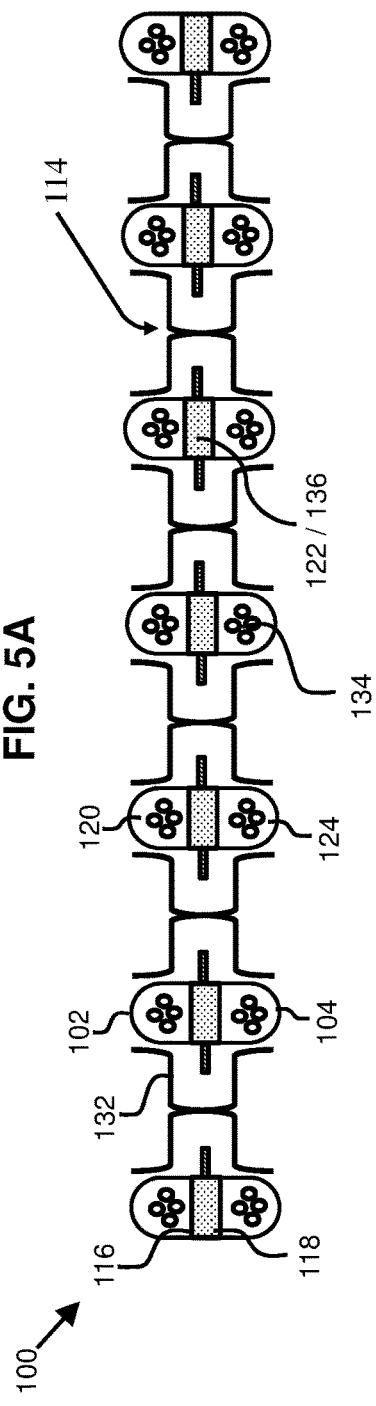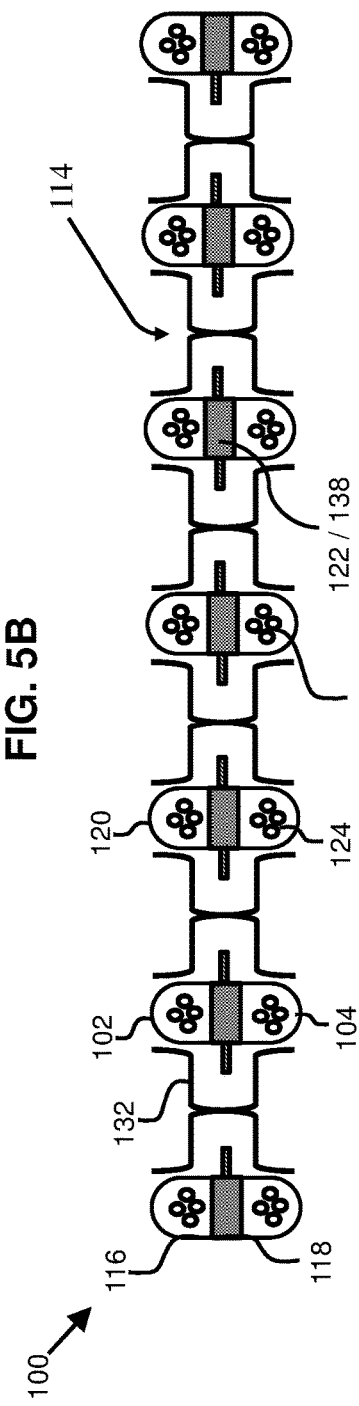

MULTICOMPARTMENT MACROENCAPSULATION DEVICES

CROSS-REFERENCE TO RELATED APPLICATIONS

This application is a national stage filing under 35 U.S.C. § 371 of International Patent Application Serial No. PCT/US2020/026437, filed Apr. 2, 2020, which claims the benefit under 35 U.S.C. § 119 (e) of U.S. Provisional Application Ser. No. 62/828,915, filed Apr. 3, 2019, each of which is incorporated herein by reference in its entirety.

FIELD

Disclosed embodiments are related to multicompartment macroencapsulation devices.

BACKGROUND

Therapeutic devices that deliver biological products can be used to treat metabolic disorders, such as diabetes. The therapeutic devices may be implantable to provide a biological product, such as insulin, for an extended period of time. Some of these devices include macroencapsulation devices used to house cells to produce the desired biological product, a matrix including the cells, or other desired therapeutics within.

SUMMARY

In one embodiment, a macroencapsulation device includes a first outer membrane, a second outer membrane, and a first semipermeable membrane disposed between the first outer membrane and the second outer membrane. A primary compartment is formed by the first semipermeable membrane and the first outer membrane, and the primary compartment is configured to house a first population of cells. A secondary compartment is formed by the first semipermeable membrane and the second outer membrane. The primary compartment and the secondary compartment are in fluid communication through the first semipermeable membrane.

In another embodiment, a macroencapsulation device includes a primary compartment configured to house a first population of cells, and a secondary compartment. The primary compartment and the secondary compartment are in fluid communication through a first semipermeable membrane disposed between the primary compartment and the secondary compartments.

In yet another embodiment, a method of using a macroencapsulation device includes: loading a first population of cells into a primary compartment of a macroencapsulation device; and applying a pressure differential between the primary compartment and a secondary compartment of the macroencapsulation device to flow a filtrate from the primary compartment to the secondary compartment through a first semipermeable membrane.

In still another embodiment, a method of using a macroencapsulation device includes: loading a first population of cells into a primary compartment of a macroencapsulation device; and flowing an ancillary agent from a secondary compartment of the macroencapsulation device into the primary compartment through a first semipermeable membrane.

Another aspect provided herein is an implantable macroencapsulation device, the device comprising: a first outer membrane; a second outer membrane; and a first semipermeable membrane attached between the first outer membrane and the second outer membrane; wherein the first semipermeable membrane and the first outer membrane are connected to form a primary compartment configured to provide a primary compartment for housing a population of cells; wherein the first semipermeable membrane and the second outer membrane are connected to form a secondary compartment; wherein the population of cells comprises pancreatic progenitor cells, endocrine cells, or beta cells, or any combination thereof; and wherein the device comprises a plurality of through holes through the first outer membrane, the second outer membrane, and the first semipermeable membrane. In some embodiments, the first outer membrane, the second outer membrane, and the first semipermeable membrane are configured to block passage of said population of cells out of the device.

In some embodiments, the device further comprises a second semipermeable membrane attached between the first semipermeable membrane and the second outer membrane to form a tertiary compartment between the primary compartment and the secondary compartment. In some embodiments, a hydraulic permeability of the first semipermeable membrane is greater than a hydraulic permeability of the first outer membrane, a hydraulic permeability of the second outer membrane, or both. In some embodiments, a hydraulic permeability of the first semipermeable membrane is greater than the hydraulic permeability of the first outer membrane, the hydraulic permeability of the second outer membrane, or both by at least about 25%. In some embodiments, a hydraulic permeability of the first semipermeable membrane is greater than a hydraulic permeability of the second semipermeable membrane. In some embodiments, a hydraulic permeability of the first semipermeable membrane is less than a hydraulic permeability of the second semipermeable membrane. In some embodiments, a porosity of the first semipermeable membrane is greater than a porosity of the first outer membrane, a porosity of the second outer membrane, or both. In some embodiments, a porosity of the first semipermeable membrane is greater than the porosity of the first outer membrane, the porosity of the second outer membrane, or both by at least about 25%. In some embodiments, a porosity of the first semipermeable membrane is greater than a porosity of the second semipermeable membrane. In some embodiments, a porosity of the first semipermeable membrane is less than a porosity of the second semipermeable membrane. In some embodiments, a flux of the first semipermeable membrane for a given material and bias (e.g. concentration gradient and/or pressure differential) is greater than a flux of the first outer membrane, a flux of the second outer membrane, or both for the same material and bias. In some embodiments, the flux of the first semipermeable membrane for a given material and bias (e.g. concentration gradient and/or pressure differential) is greater than the flux of the first outer membrane, the flux of the second outer membrane, or both by at least about 25% for the same material and bias. In some embodiments, a flux of the first semipermeable membrane for a given material and bias (e.g. concentration gradient and/or pressure differential) is greater than a flux of the second semipermeable membrane for the same material and bias. In some embodiments, a flux of the first semipermeable membrane for a given material and bias (e.g. concentration gradient and/or pressure differential) is less than a flux of the second semipermeable membrane for the same material and bias. In some embodiments, the device further comprises a primary port in fluid communication with the primary compartment, a secondary port in fluid communication with the secondary compartment, or any combination thereof. In some embodiments, the device further comprises a primary port in fluid communication with the primary compartment, a secondary port in fluid communication with the secondary compartment, a tertiary port in fluid communication with the tertiary compartment, or any combination thereof. In some embodiments at least one of the primary port the secondary port, or the tertiary port are sealable or re-sealable.

Another aspect provided herein is an implantable macroencapsulation device comprising a primary compartment configured to house one or more cells, and a secondary compartment, wherein the primary compartment and the secondary compartment are separated by a first semipermeable membrane, wherein the secondary compartment and the first semipermeable membrane are configured to i) filter a filtrate from the primary compartment, or ii) provide an ancillary agent to the one or more cells within the primary compartment, or both i) and ii); and wherein said one or more cells are encapsulated within said device from a range of about $10^3$ to about $10^6$ cells per μL of volume.

In some embodiments, the device further comprises a tertiary compartment, wherein the tertiary compartment and the secondary compartment are separated by a second semipermeable membrane, wherein the second semipermeable membrane is configured to i) filter a filtrate from the tertiary compartment, or ii) provide an ancillary agent to the one or more cells within the tertiary compartment, or both i) and ii). In some embodiments, the device further comprises at least one of a primary port in fluid communication with the primary compartment, or a secondary port in fluid communication with the secondary compartment. In some embodiments, the device further comprises at least one of a primary port in fluid communication with the primary compartment, a secondary port in fluid communication with the secondary compartment, or a tertiary port in fluid communication with the tertiary compartment. In some embodiments at least one of the primary port, the secondary port, or the tertiary port are sealable or re-sealable. In some embodiments, wherein the device comprises a plurality of through holes extending from one side of the device to an opposing side of the device through the layered membranes.

In some embodiments, one or more of the through holes are surrounded by a bonded portion of the membranes to form a seal. In some embodiments, the device comprises three or more seals. In some embodiments, the device comprises two or more self-intersecting seals. In some embodiments, the device comprises two or more elliptical seals. In some embodiments the seal is formed by an adhesive, an epoxy, a weld, any combination thereof, and/or any other appropriate bonding methods. In some embodiments, the first semipermeable membrane is configured to block passage of said one or more cells. In some embodiments, the primary compartment and the secondary compartment are configured to block passage of said one or more cells. In some embodiments the primary compartment, the secondary compartment, and the tertiary compartment are configured to block passage of said one or more cells.

Another aspect provided herein is a method, comprising: providing a macroencapsulation device comprising a primary compartment configured to house one or more cells, and a secondary compartment, wherein the primary compartment and the secondary compartment are separated by a first semipermeable membrane, wherein the secondary compartment and the semipermeable membrane are configured to i) filter a filtrate from the primary compartment, or ii) provide an ancillary agent to the one or more cells within the primary compartment, or both i) and ii); pre-vascularizing the macroencapsulation device; loading one or more cells into the primary compartment; and applying a pressure to the secondary compartment to remove a filtrate from the primary compartment.

In some embodiments the filtrate is removed from the primary compartment. In some embodiments, the method further comprises administering an ancillary agent into the primary compartment, the secondary compartment, or both. In some embodiments the ancillary agent comprises a drug, an oxygen generating substance, an anti-coagulant, a nutrient, or any combination thereof. In some embodiments administering the ancillary agent is performed after applying a negative pressure to the secondary compartment, though any method of providing a desired pressure differential of the secondary compartment relative to another compartment of the macroencapsulation device may also be used. In some embodiments, the method further comprises, inflating the primary compartment, the secondary compartment, or both. In some embodiments inflating the primary compartment, the secondary compartment, or both is performed before the prevascularizing of the macroencapsulation device. In some embodiments, the method further comprises, sealing the primary compartment, the secondary compartment, or both. In some embodiments, the method further comprises resealing the primary port, the secondary port, or both. In some embodiments, the housing further comprises a tertiary compartment separated from the secondary compartment by a second semipermeable membrane, and wherein the method further comprises loading one or more cells into the tertiary compartment. In some embodiments, the method further comprises administering an ancillary agent into the primary compartment, the secondary compartment, or the tertiary compartment, or any combination thereof. In some embodiments, the method further comprises inflating the primary compartment, the secondary compartment, or the tertiary compartment, or any combination thereof. In some embodiments, the method further comprises sealing the primary compartment, the secondary compartment, or the tertiary compartment, or any combination thereof. In some embodiments, the method further comprises resealing the primary port, the secondary port, the tertiary compartment, or any combination thereof.

Another aspect provided herein is a method, comprising: providing a macroencapsulation device comprising: a first outer membrane; a second outer membrane; and a first semipermeable membrane attached between the first outer membrane and the second outer membrane; wherein the first semipermeable membrane and the first outer membrane are connected to form a primary compartment configured for housing a population of cells; and wherein the first semipermeable membrane and the second outer membrane are connected to form a secondary compartment; pre-vascularizing the macroencapsulation device; loading one or more cell into the primary compartment; and applying a pressure differential to the secondary compartment to remove a filtrate from the primary compartment.

In some embodiments the filtrate is removed from the primary compartment. In some embodiments, the method further comprises administering an ancillary agent into the primary compartment, or the secondary compartment, or both. In some embodiments the ancillary agent comprises a drug, an oxygen generating substance, an anti-coagulant, a nutrient, or any combination thereof. In some embodiments administering the ancillary agent is performed after the applying a negative pressure or other pressure differential to the secondary compartment. In some embodiments, the method further comprises inflating the primary compartment, or the secondary compartment, or both. In some embodiments inflating the primary compartment, or the secondary compartment, or both is performed before prevascularizing of the macroencapsulation device. In some embodiments, the method further comprises sealing the primary compartment, or the secondary compartment, or both. In some embodiments, the method further comprises resealing the primary port, the secondary port, or both. In some embodiments, the macroencapsulation device further comprises a tertiary compartment separated from the secondary compartment by a second semipermeable membrane, and wherein the method further comprises loading one or more cell into the tertiary compartment. In some embodiments, the method further comprises administering an ancillary agent into the primary compartment, the secondary compartment, or the tertiary compartment, or any combination thereof. In some embodiments the filtrate is removed from the primary compartment, the tertiary compartment, or both. In some embodiments, the method further comprises inflating the primary compartment, the secondary compartment, the tertiary compartment, or any combination thereof. In some embodiments, the method further comprises sealing the primary compartment, the secondary compartment, or the tertiary compartment, or any combination thereof. In some embodiments, the method further comprises resealing the primary port, the secondary port, the tertiary compartment, or any combination thereof.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIGS. 5A-5C shows a cross-sectional illustration of vascularization, cell filling, filtration, and application of an ancillary agent using a macroencapsulation device including three compartments according to some embodiments.

DETAILED DESCRIPTION

Figure 1A:
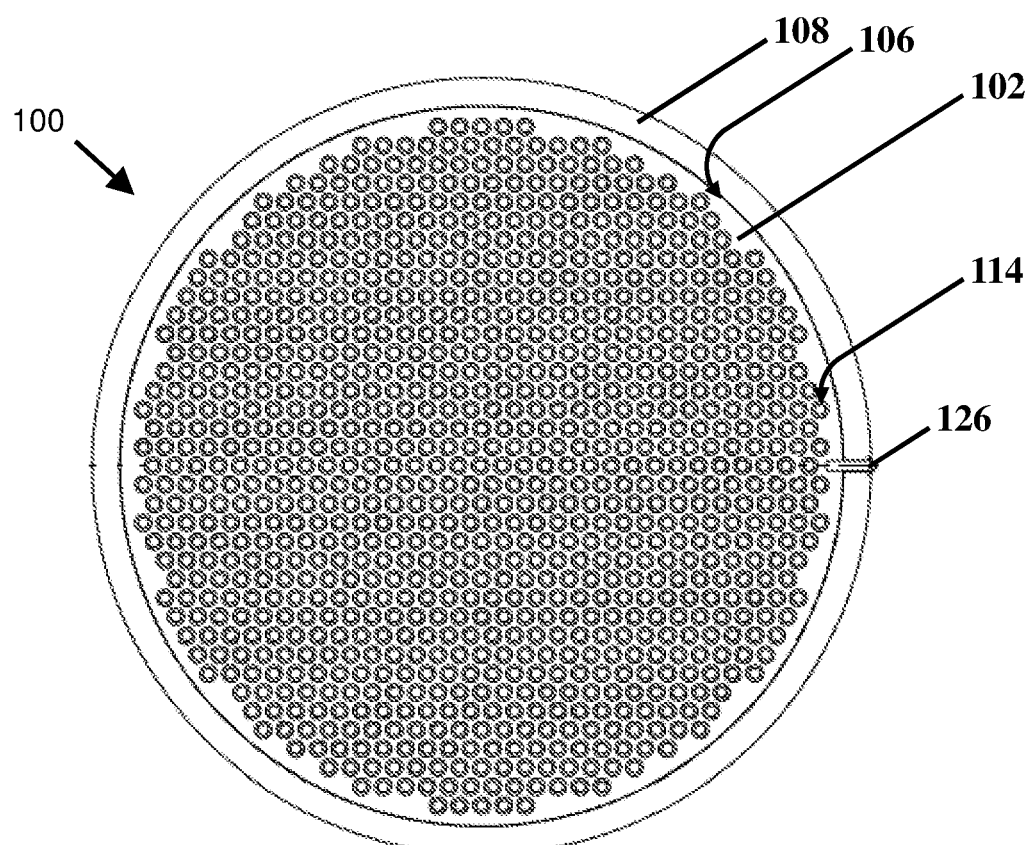
FIG. 1A shows a top view of a macroencapsulation device according some embodiments.

Some macroencapsulation devices are configured for implantation of cells in a host without prevascularized support from surrounding tissue. Cells implanted through such devices, however, often suffer from hypoxia or poor nutrition during the period of time between implantation and vascularization. As vascularization often spans a week or more, such detrimental cell conditions often cause cell necrosis and subsequent efflux of immunogenic cellular debris, which triggers a foreign body response that ultimately leads to device failure. In contrast, prevascularized devices are implanted into the body while empty to integrate with the host prior to introduction of any cellular matter. Such devices have been shown to enable greater cell survival.

While advantageous, the Inventors have recognized that loading cells into a macroencapsulation device that is surrounded by and integrated with host tissue has thus far proven difficult. First, the introduction of cells into a prevascularized macroencapsulation device typically use ultrafiltration and pressurization and/or a very high concentration of cells within the device to provide a desired amount of cells within the device. While ultrafiltration and pressurization may enable the introduction of an effective cell density into a device, the force exerted through the membrane during ultrafiltration can lead to dissociation of the device from the newly formed microvasculature, and/or an exacerbated foreign body response due to tissue trauma. Further, loading high concentrations of cells within a macroencapsulation device may impart shear forces on the surface of the cells during loading. This may result in cell aggregation which may form occlusions within the interior of the device which may damage the cells and/or inhibit loading of the device to a desired effective cell density.

In view of the above, the Inventors have recognized the benefits associated with a macroencapsulation device that includes multiple at least partially coextensive internal compartments that are in fluid communication with each other through one or more semipermeable internal membranes disposed between these compartments. Such a construction may permit at least one of the compartments to be configured to accept the desired one or more populations of cells while at least one of the other compartments, e.g. a secondary compartment may be in fluid communication with the one or more compartments containing the cells. This may allow filtrate from the one or more compartments including the cells to flow through a semipermeable membrane into the one or more other compartments, e.g. the secondary compartment. In some instances, this filtrate may be removed from this secondary compartment. This secondary compartment may also be used to introduce a desired ancillary agent into the device which may then flow into the one or more compartments including the cells through a semipermeable membrane located between the compartments. Such a device may substantially prevent and/or at least reduce the trauma to the integrated tissue around a device and the cells contained therein during a filling process.

In one embodiment, a macroencapsulation device may be formed by a first outer membrane and a second outer membrane. The first and second outer membranes may be bonded to one another in any appropriate fashion to form an internal volume between the first and second outer membranes. For example, a portion of the first and second outer membranes extending at least partially around a perimeter of the membranes may be bonded either directly or indirectly to one another. For example, a membrane may be folded over and bonded along its free edges such that the single membrane functions as both the first and second outer membranes. Alternatively, two separate outer membranes may be bonded at portions extending along their entire perimeter though any appropriate method of forming an internal volume with a membrane material may be used. In either case, the macroencapsulation device may also include at least a first semipermeable membrane disposed between the first and second outer membranes that divides the internal volume into a primary compartment and a secondary compartment that are in fluid communication with one another through the first semipermeable membrane. The first compartment may be configured to house a first population of cells that may be loaded into the primary compartment. Thus, the macroencapsulation device may be configured such that a filtrate from the primary compartment may flow into the secondary compartment and/or an ancillary agent may be introduced into the secondary compartment which may then flow into the primary compartment where the cells are located as elaborated on below.

In some embodiments, the macroencapsulation device may also include at least a second semipermeable membrane disposed between the first semipermeable membrane and the second outer membrane. The secondary compartment may be formed between the first and second semipermeable membranes and a tertiary compartment may be formed between the second semipermeable membrane and the second outer membrane. Thus, the tertiary compartment may be in fluid communication with the secondary compartment through the second semipermeable membrane. Additionally, in some embodiments, the secondary compartment may be disposed between the primary and tertiary compartments. In some embodiments, the tertiary compartment may also be configured to house a second population of cells. Thus, a filtrate may also flow into the secondary compartment from the tertiary compartment and/or an ancillary agent may flow from the secondary compartment into the tertiary compartment similar to that described above. Depending on the particular embodiment, the second population of cells may either be the same and/or different than a population of cells held in the primary compartment of the macroencapsulation device.

It should be understood that the filtrate and/or ancillary agents that flow between the various compartments of a macroencapsulation device may be biased to flow between the compartments in any appropriate fashion. For example, in some embodiments, a pressure differential may be applied between adjacent compartments to induce the flow of a filtrate and/or an ancillary agent from one compartment to another. For example, the pressure within one compartment may be increased due to the flow of material into the compartment and/or a pressure within an adjacent compartment may be reduced using a vacuum applied to that compartment. In either case, a static pressure, pressure differential, flow rate, shear stresses applied to the cells, and/or other appropriate operating parameters may be controlled to avoid cell aggregation and/or death. For example, a pressure differential between two adjacent compartments may be kept below a threshold pressure in some embodiments to help maintain cell viability. Further, in some embodiments in which an ancillary agent is applied, the ancillary agent may be introduced into the secondary compartment, however, there may be little to no pressure differential between the secondary compartment and an adjacent compartment including a population of cells. In such an embodiment, the ancillary agent may flow into these other compartments due to diffusion of the ancillary agent due to concentration gradient induced diffusion of the ancillary agent where a concentration of the ancillary agent within the secondary compartment is greater than a concentration of the ancillary agent in the adjacent compartment including the population of cells.

Appropriate types of filtrates that may be used when loading a cell population into a compartment of a macroencapsulation device may include, but are not limited to, cell culture media, alginates, extracellular matrix proteins, platelet-rich plasma, thrombin, poly(vinyl alcohol), poly(ethylene glycol), propylene glycol, cryopreservation solutions, and pectin. Of course, it should be understood that any appropriate type of filtrate that is biologically compatible with the host and cell populations may be used as the disclosure is not limited to any particular type of filtrate.

In embodiments in which an ancillary agent has been provided to a secondary compartment of a macroencapsulation device, the ancillary agent may correspond to any appropriate agent as the disclosure is not limited to any particular agent. For example, in some embodiments, it may be desirable to provide an agent that promotes oxygenation of the cells, a secondary therapeutic for the host, and/or any other appropriate agent to provide a desired functionality for the macroencapsulation device. Accordingly, an ancillary agent may include a therapeutic such as a drug, an oxygen generating substance, an anti-coagulant, a nutrient, anti-inflammatory drugs, steroids, growth factors, pro-drugs, immunomodulatory molecules, differentiation factors, any combination thereof, and/or any other appropriate agent as the disclosure is not limited in this fashion.

As noted above, in some instances, it may be beneficial to pre-vascularize a macroencapsulation device prior to the introduction of a population of cells. Again, this may improve the flow of nutrients to the cells disposed within the interior of the device, increase a flow of waste and/or a therapeutic out of the device to the host, and/or may also reduce the occurrence of a fibrotic response to implantation of the device. Accordingly, in some embodiments, a macroencapsulation device may be implanted and prevascularized during a first period of time. In such an embodiment, at least one of the first membrane and the second membrane are configured to enable vascularization of the cell within the device. In some embodiments, at least one of the first membrane and the second membrane are configured to enable, support or allow vascularization of the cell within and around the device in absence of an immune suppression therapy, or with reduced immune suppression therapy as compared to a comparable device that does not support such vascularization. In some instances, this may include the use of a plurality of through holes that extend from a first surface of the macroencapsulation device through the intervening membranes to a second opposing surface of the macroencapsulation device. The vasculature may grow into and through these through holes in such an embodiment.

During this prevascularization period it may be beneficial for the device to be inflated to help maintain the membranes and associated compartments of the macroencapsulation device in an appropriate configuration for subsequent loading of a population of cells into the device. Accordingly, in some embodiments, a fluid may be introduced into one or more compartments of a macroencapsulation device to inflate the one or more compartments either prior to, during, and/or after implantation of the device. This may include inflating the primary, secondary, and/or tertiary compartments of a macroencapsulation device. Appropriate types of fluids that may be used to inflate the various compartments of the macroencapsulation device may include, but are not limited to, oxygen, saline, cell culture media, alginate, chitosan, dextrose, perfluorocarbons, combinations thereof, and/or any other appropriate fluid capable of inflating the device. In some instances the outer membranes of a macroencapsulation device may be configured to retain the inflation fluid within an interior of the device during implantation to prevent collapse of the membrane structure during the prevascularization period. The macroencapsulation device may then be left implanted for an appropriate period of time to allow integration of the macroencapsulation device with the surrounding tissue and for vasculature to establish a desired flow of nutrients to the macroencapsulation device. One or more compartments of the macroencapsulation device may then be loaded with one or more desired populations of cells as described further below.

In some embodiments of the various macroencapsulation devices disclosed herein, at least one of the first outer membrane and the second outer membrane are semipermeable. For example, either one of the outer membranes may be semipermeable and the other may be substantially impermeable or both may be semipermeable. In some embodiments, the semipermeability of the first membrane, the second membrane, or both is configured to protect the cell from an immune attack and/or to block passage of the population of cells out of the device while permitting the passage of a desired biological product produced by the cells as well as waste and nutrients used and produced by the cells. In some embodiments, the semipermeability of the first membrane, the second membrane, or both is configured to protect the cell from an immune attack in the absence of an immune suppression therapy. Thus, the first outer membrane, the second outer membrane, or both may be configured to be substantially impermeable to one or more populations of cells within the device, a filtrate, an ancillary agent, or any combination thereof contained within the device.

In addition to the relative permanence of the outer membranes, the one or more semipermeable membranes located within the interior volume of a macroencapsulation device may also be appropriately configured to control the flow of one or more materials between the various compartments of the macroencapsulation device. For example, in the various embodiments described herein, the first semipermeable membrane, the second semipermeable membrane, and/or any appropriate number of semipermeable membranes disposed within the interior volume of the device may be substantially permeable to a filtrate flowing from one compartment to another compartment, an ancillary agent to be provided into the interior of a device, or both. Further, the interior semipermeable membranes may also be substantially impermeable to the one or more populations of cells disposed within the macroencapsulation device. Thus, the interior semipermeable membranes may be configured to prevent the flow of cells between adjacent compartments while permitting the flow of a filtrate and/or ancillary agent there between.

In view of the above, a hydraulic permeability, pore size, and/or porosity of the interior semipermeable membranes, such as a first and/or second semipermeable membrane may be different than a hydraulic permeability, pore size, and/or porosity of the first and/or second outer membranes of a macroencapsulation device. For example, a hydraulic permeability of a first and/or second semipermeable membrane may be greater than a hydraulic permeability of either one or both of the first and second outer membranes. This may correspond to an increased porosity, pore size, or other appropriate difference in a material parameter of the interior semipermeable membranes relative to the outer membranes. Similarly, depending on the particular embodiment, the first outer membrane and the second outer membrane may either have equal or different hydraulic permeabilities, pore sizes, and/or porosities from each other. For example, if different materials are housed within separate compartments formed by the first and second outer membranes, such as housing different populations of cells, the first outer membrane may exhibit a hydraulic permeability that is either less than or greater than that of the second outer membrane to provide a desired combination of membrane properties that are individually tailored for each cell populations. Similarly, in instances where multiple interior semipermeable membranes, such as a first and second semipermeable membrane disposed between two outer membranes are used, the interior semipermeable membranes may exhibit either the same and/or different hydraulic permeabilities, pore sizes, and/or porosities. For instance, the hydraulic permeability of a first semipermeable membrane may be greater than or less than that of a second semipermeable membrane.

In view of the above, in some embodiments, an interior semipermeable membrane, such as a first and/or second semipermeable membrane disposed between two outer membranes, may exhibit a hydraulic permeability that is greater than a hydraulic permeability of either one or both outer membranes by at least about 25%, 30%, 35%, 40%, 45%, 55%, 60%, 65%, 70%, 75%, 80%, 85%, 90%, 95%, or 100%. Ranges extending between any of the foregoing percentages are contemplated. For example a hydraulic permeability of an interior semipermeable membrane may be between about 25% and 100% greater than a hydraulic permeability of either one or both outer membranes. In some embodiments, this difference in hydraulic permeability may be relative to an outer membrane the interior semipermeable membrane is disposed against to form a corresponding compartment. Of course hydraulic permeabilities both greater than and less than those noted above are also contemplated as the disclosure is not limited in this fashion.

The above noted relative hydraulic permeabilities of the various membranes may be measured in any appropriate fashion. For example, a relative hydraulic permeability of different membrane materials may be measured using a constant head, or constant pressure, measurement using an appropriate fluid, such as water, for a given sample geometry as is known in the art. Of course any appropriate flow testing method, calculation, or modeling method may be used to determine the relative hydraulic permeabilities of the membranes as the disclosure is not limited to the particular method in which these relative parameters are measured.

Similar to the above, to provide the desired differences in relative permeability of the various membranes of a macroencapsulation device, in some embodiments, a porosity and/or pore size of one or more of the interior semipermeable membranes of a macroencapsulation device may be greater than a porosity and/or pore size of one or both of the first and second outer membranes. Again, this difference may be relative to an adjacent outer membrane in some embodiments. In either case, a porosity and/or pore size of an interior semipermeable membrane may be greater than a porosity and/or pore size of one or both of the outer membranes by at least about 25%, 30%, 35%, 40%, 45%, 55%, 60%, 65%, 70%, 75%, 80%, 85%, 90%, 95%, or 100%. Ranges extending between any of the foregoing percentages are contemplated. For example a porosity and/or pore size of an interior semipermeable membrane may be between about 25% and 100% greater than a pore size and/or porosity of either one or both outer membranes. In addition to the foregoing, in some embodiments, a porosity and/or pore size of a first semipermeable membrane may be different from a porosity and/or pore size of a second semipermeable membrane disposed between the outer membranes.

In view of the above differences in material parameters, a flux of a predetermined material across an interior semipermeable membrane under a predetermined pressure differential and/or concentration gradient may be greater than a flux of the same material across either one or both outer membranes under the same pressure differential and/or concentration gradient. Similarly, depending on the desired application, the first and second outer membranes may either exhibit the same or different hydraulic properties. Accordingly, a flux of a material across the first and second outer membranes of a macroencapsulation device under a specific pressure differential and/or concentration gradient may either be substantially the same or different from one another. For example, the flux across the first outer membrane may be less than or greater than the flux across the second outer membrane under the same bias. Similarly, the flux of the material across a first semipermeable membrane disposed between the outer membranes of a device may be different than a flux of the material across a second semipermeable membrane (i.e. less than or greater than). A difference of the flux of the material across the different membranes may be greater than about a 5% difference in the relative fluxes. Appropriate materials that may experience this difference in fluxes may include, but are not limited to, insulin, small molecule therapeutics, growth factors, antibodies, antibody fragments, immunomodulatory factors, complement complexes, cell fragments, enzymes, alginates, saline, and cell culture media. Again, the relative fluxes of a predetermined material across the various membranes may be measured using any appropriate flow testing method, calculation, or modeling method including, for example, a constant head or pressure differential measurement, concentration gradient measurements across a membrane, and/or any other appropriate method as the disclosure is not limited to how the relative fluxes are measured.

It should be understood that the various relationships of permeabilities, pore sizes, porosities, relative fluxes, and other material parameters described herein may be applied to any of the described embodiments of a macroencapsulation device. However, it should also be understood that the disclosure is not limited to only these specific ranges of material properties and relative performance parameters. For example, both interior semipermeable membranes and outer membranes may exhibit ranges of permeabilities, pore sizes, porosities, relative fluxes, and other material parameters that are either greater than or less than the specific ranges and relationships described herein as the disclosure is not limited in this fashion.

The various membranes of a macroencapsulation device, including the outer membranes and/or the interior semipermeable membranes, may be formed from any appropriate biocompatible material. The biocompatible material may be substantially inert towards cells housed within the macroencapsulation device, a filtrate, an ancillary agent, or any combination thereof. The biocompatible material may comprise a synthetic polymer or a naturally occurring polymer. In some embodiments, the polymer may also be a linear polymer, a cross linked polymer, a network polymer, an addition polymer, a condensation polymer, an elastomer, a fibrous polymer, a thermoplastic polymer, a non-degradable polymer, combinations of the foregoing, and/or any other appropriate type of polymer as the disclosure is not limited in this fashion. Appropriate types of polymers may comprise polyvinylchloride (PVC), polyethylene (PE), polypropylene (PP), polymethylmetacrylate (PMMA), polystyrene (PS), polytetrafluoroethylene (PTFE), expanded polytetrafluoroethylene (ePTFE), polyurethane (PU), polyamide (nylon), polyethylenterephthalate (PET), polyethersulfone (PES), polyetherimide (PEI), polyvinylidene difluoride (PVDF), Polycaprolactone (PCL), poly(lactic-co-glycolic acid) (PLGA), poly-L-lactide (PLLA), any combination of the foregoing, and/or any other appropriate polymeric material. The synthesis methods used for forming one or more of the porous membranes from the above noted polymeric materials may include, but are not limited to, expansion, solvent-casting, immersion precipitation and phase separation, electrospinning, methods that yield isoreticular network, methods that yield trabecular network, or any other appropriate method of forming a porous polymer membrane. In some embodiments, sintering of porous polymeric membranes may be used to alter the porosity of the membranes, which in turn can be used to tune the porosity and the flux properties of the macroencapsulation device. Thus, in some embodiments, any desired combination of the outer and/or inner semipermeable membranes may either be sintered or unsintered using any appropriate sintering method depending on the particular membrane material.

While polymeric materials are noted above, embodiments in which the membranes are made at least partially from a non-polymeric material are contemplated. For example, an appropriate membrane materials may include a ceramic material, a polymer ceramic composite, and/or any other appropriate material capable of function as a membrane in an implanted macroencapsulation device as the disclosure is not limited to any specific materials from which the membranes are formed.

The inner and outer membranes of a macroencapsualtion device as described herein may be made from porous membrane materials that are configured to allow for transport through the membranes of materials, such as a biological product, with a molecular weight less than about 3000 kDa, 2000 kDa, 1000 kDa, 500 kDa, 400 kDa, 300 kDa, 200 kDa, 100 kDa, 50 kDa, 40 kDa, 30 kDa, 20 kDa, 10 kDa, 6 kDa, 5 kDa, 4 kDa, 3 kDa, 2 kDa, 1 kDa, and/or any other appropriate range of molecular weights depending on the desired application. For example, the one or more membranes of a macroencapsulation device may be configured to permit the flow of insulin through the membranes which has a molecular weight of about 5.8 kDa.

To provide the desired selectivity, the porous membranes used with the macroencapsulation devices disclosed herein may have an open porous structure with average pore sizes that are greater than or equal to about 1 nm, 5 nm, 10 nm, 15 nm, 20 nm, 30 nm, 40 nm, 50 nm, 60 nm, 70 nm, 80 nm, 90 nm, 100 nm, 200 nm, 300 nm, and/or any other appropriate size range. Correspondingly, the average pore size of the various membranes described herein may have an average pore size that is less than or equal to 2500 nm, 2000 nm, 1700 nm, 1500 nm, 1400 nm, 1300 nm, 1200 nm, 1100 nm, 1000 nm, 900 nm, 800 nm, 700 nm, 600 nm, 500 nm, 400 nm, 300 nm, 200 nm, 100 nm, 90 nm, 80 nm, 70 nm, 60 nm, 50 nm, 40 nm, 30 nm, 20 nm, and/or any other appropriate size range. Combinations of the foregoing are contemplated including, for example, an average pore size that is between or equal to 1 nm and 20 nm, 1 nm and 2500 nm, and/or any other appropriate combination. Of course, while specific average pore sizes are described above, it should be understood that any appropriate average pore size may be used for the various membranes described herein including average pore sizes both greater than and less than those noted above.

To provide sufficient strength and/or rigidity for a macroencapsulation device, the various membranes may be made from materials that are sufficiently stiff. The desired stiffness may be provided via an appropriate combination of a materials Young's modulus, thickness, and overall construction which may be balanced with a desired permeability of the device. Appropriate Young's moduli for the various membranes described herein may be at least $10^5$ Pa, $10^6$ Pa, $10^7$ Pa, $10^8$ Pa, $10^9$ Pa, $10^{10}$ Pa, and/or any other appropriate moduli both greater than and less than these ranges. Of course ranges between the foregoing Young's moduli are contemplated including, for example, a Young's modulus between or equal to about $10^6$ Pa and $10^{10}$ Pa.

In some embodiments, it may be desirable for one or more of the membranes included within a macroencapsulation device to be hydrophilic to facilitate loading of cells into the macroencapsulation device and/or the flow of one or more filtrates, biological compounds, therapeutics, or other materials into, out of, and/or between different compartments of the device. Additionally, a hydrophilic outer membrane may also reduce the occurrence of fibrosis when the device is positioned in vivo. Accordingly, the inner and outer membranes of the macroencapsulation device may either be made from a hydrophilic material and/or treated with a hydrophilic coating. Appropriate materials for forming a hydrophilic coating may include, but are not limited to an appropriate hydrophilic polymer, polyethylene glycol, polyvinyl alcohol, polydopanine, any combination thereof, and/or any other appropriate hydrophilic material capable of forming a coating on the membranes.

The membranes described in the various embodiments of macroencapsulation devices described herein may be bonded to one another using any appropriate bonding method as the disclosure is not limited in this fashion. For example, adjacent membranes may be bonded to one another using an adhesive, an epoxy, a weld or other fusion based technique (e.g. ultrasonic bonding, laser bonding, physical bonding, thermal bonding, etc.), mechanical clamping using a frame or fixture, and/or any other appropriate bonding method. In one specific embodiment, adjacent membranes may be bonded using a heated tool that is used to press or strike two or more membranes against each other for a set fusion time with a predetermined pressure and/or force. In view of the above, it should be understood that the current disclosure is not limited to the use of any particular method for bonding the membranes together.

A macroencapsulation device as described herein may have any appropriate combination of internal volumes, external dimensions, and/or other appropriate physical parameter. For example, an internal volume encompassed by the outer membranes of a macroencapsulation device may be between or equal to 40 µL, and 250 µL. A width, or maximum transverse dimension, of the macroencapsulation device may also be between about 20 mm and 80 mm. Additionally, to provide a desired diffusion of oxygen into the interior of a macroencapsulation device to support cells contained therein, a maximum oxygen diffusion distance from an exterior of the device to an interior portion of the device including a population of cells may be less than 50 µm, 100 µm, 150 µm, 200 µm, 250 µm, 300 µm, 350 µm, 400 µm, 450 µm, or 500 µm. Correspondingly, a maximum thickness, or dimension perpendicular to a maximum transverse dimension, of the overall device and/or a compartment within the device may be less than 50 µm, 100 µm, 150 µm, 200 µm, 250 µm, 300 µm, 350 µm, 400 µm, 450 µm, or 500 µm. Further, in some embodiments, an outer surface area to volume ratio of the device may be greater than or equal to about 20 $cm^{-1}$, 40 $cm^{-1}$, 60 $cm^{-1}$, 80 $cm^{-1}$, 100 $cm^{-1}$, 120 $cm^{-1}$, or 150 $cm^{-1}$. Ranges extending between any of the forgoing values for the various dimensions and parameters are also contemplated. Additionally, while specific ranges of parameters for the overall macroencapsulation device are given above, operating parameters and dimensions both greater than and less than those noted above are contemplated as the disclosure is not limited to any particular size or construction.

As elaborated on below, in some embodiments, the compartments within a macroencapsulation device may be formed such that the interior volumes of these compartments are subdivided into a plurality of interconnected channels, which in some embodiments may be shaped like a lumen though any appropriate shape or configuration of the channels may also be used. The channels may have an inner maximum transverse dimension, such as an inner diameter, that is greater than or equal to 40 µm, 50 µm, 100 µm, 200 µm, 300 µm, 400 µm, and/or any other appropriate dimension. Correspondingly, the channels may have an inner maximum transverse dimension that is less than or equal to 800 µm, 700 µm, 600 µm, 500 µm, 400 m, and/or any other appropriate dimension. Combinations of the foregoing are contemplated including, for example, an inner maximum transverse dimension of the plurality of channels that is between or equal to 40 µm and 800 µm. Further, a density of the interconnected channels forming the various compartments of a device may have a density per unity area within a transverse plane of the device that is be greater than or equal to about 10 channels/$cm^2$, 15 channels/$cm^2$, 20 channels/$cm^2$, 25 channels/$cm^2$, 30 channels/$cm^2$, 35 channels/$cm^2$, 40 channels/$cm^2$, 45 channels/$cm^2$, 50 channels/$cm^2$, 60 channels/$cm^2$, 70 channels/$cm^2$, 80 channels/$cm^2$, 90 channels/$cm^2$, 100 channels/$cm^2$, 110 channels/$cm^2$, 120 channels/$cm^2$, 130 channels/$cm^2$, 140 channels/$cm^2$, 150 channels/$cm^2$, 175 channels/cm2, or 200 channels/$cm^2$. Ranges extending between any of the above noted density of channels are also contemplated including, for example, a density of channels that is between or equal to about 10 channels/$cm^2$ and 200 channels/$cm^2$. Though densities both greater than and less than the ranges described above are also contemplated.

While specific dimensions and relationships related to the macroencapsulation device and the materials it is made from are described above, it should be understood that dimensions and relationships both greater than and less than those noted above are contemplated as the disclosure is not limited in this fashion. Accordingly, any appropriate size, construction, and/or relative performance parameters may be used for a device depending on the desired application.

In some embodiments, a cell population contained within a compartment of a macroencapsulation device may be an insulin secreting cell population. In some embodiments, the cell population comprises at least one cell derived from a stem cell derived cell. In some embodiments, at least one cell is a genetically modified cell. In some cases, at least one cell is genetically engineered to reduce an immune response in a subject upon implantation of the device, as compared to comparable cells that are not genetically engineered. In some embodiments, the cell population is a stem cell derived cell that is capable of glucose-stimulated insulin secretion (GSIS). For example, an appropriate population of cells may comprise pancreatic progenitor cells, endocrine cells, beta cells, a matrix including one or more of the foregoing, or any combination thereof. Further, a matrix may comprise isolated islet cells, isolated cells from pancreas, isolated cells from a tissue, stem cells, stem cell-derived cells, induced pluripotent cells, differentiated cells, transformed cells, or expression systems, which can synthesize one or more biological products. Optionally, in some embodiments, the matrix may comprise a second type of cells that support the first type of cells that synthesize one or more biological products. In some embodiments, the cells may be encapsulated before being placed within the matrix. In such an embodiment, the cells may be encapsulated in a microcapsule or may be conformally coated. However, naked, i.e. uncoated, cells may also be used.

Depending on the particular embodiment, a therapeutically effective density of cells may be loaded into one or more compartments of a macroencapsulation device. Appropriate cell densities disposed within a compartment may be greater than or equal to about 1000 cells/$\mu$L, 10,000 cells/$\mu$L, 50,000 cells/$\mu$L, 100,000 cells/$\mu$L, 500,000 and/or any other appropriate cell density. Appropriate cell densities disposed within the compartment may also be less than or equal to about 1,000,000 cells/$\mu$L, 500,000 cells/$\mu$L, 100,000 cells/$\mu$L, 50,000 cells/$\mu$L, 10,000 cells/$\mu$L, and/or any other appropriate cell density. Combinations of the foregoing are contemplated including cell densities between about 1000 cells/$\mu$L, and 1,000,000 cells/$\mu$L. Of course, cell densities both greater than and less than those noted above may also be used depending on the desired application and cell types being used.

The macroencapsulation devices described herein may be implanted in a subject in vivo at various sites. In one example, a device may be implanted in a subject by properitoneal or retrorectus implantation. In other examples, the device can be placed by intra-omental implantation. In another example, the device can be placed by subcutaneous implantation. In another example, the device can be placed by suprahepatic implantation. In some instances, the macroencapsulation devices described herein may be fixed in vivo at an implantation site using any appropriate fixation method including, for example, the application of a tissue adhesive. Appropriate tissue adhesives may include, but are not limited to, fibrin, cyanoacrylate, polyethylene glycol, albumin-based adhesive, polymer-based adhesive, and/or any other appropriate adhesive. In another example, the device may be fixed using platelet-rich plasma and/or any other appropriate fixation method as the disclosure is not limited in this fashion.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIGS. 1A-1D illustrate one embodiment of an implantable macroencapsulation device 100 configured to encapsulate a population of cells. Again the population of cells may comprise at least one of a pancreatic progenitor cell, an endocrine cell, a beta cell, and/or any other appropriate population of cells as described herein. In the depicted embodiment, the macroencapsulation device has generally flat planar configuration that extends in a direction parallel to a transverse plane in which the device is oriented. The macroencapsulation device depicted in the figures has a generally rounds planar shape, however other shapes including squares, rectangles, hexagons, triangles, and/or any other appropriate shape, including non-planar configurations are also contemplated as the disclosure is not limited in this fashion.

The macroencapsulation device 100 includes a first outer membrane 102 disposed on a second outer membrane 104. At least a portion of the first and second outer membranes may be bonded to one another to form an interior volume disposed between the outer membranes. For example, as illustrated in the figures, the first and second outer membranes may be bonded to one another at least at a portion 106 extending around a perimeter, or other appropriate portion, of the membranes to form the desired interior volume. In some embodiments, the device may also include a frame 108 attached to one or more portions of the overall device. In the depicted embodiment, the frame is attached to and extends around an exterior perimeter of the macroencapsulation device. However, instances in which the frame only extends around a portion of a perimeter of the device are also contemplated. The frame may be attached to the outer membranes using any appropriate method including, but not limited to, adhesives, epoxies, mechanical fasteners, thermal bonding, and/or any other appropriate bonding method as the disclosure is not limited in this fashion.

As noted previously, the macroencapsulation devices described herein may include two or more internal compartments that are at least partially coextensive with one another in a within plane that is parallel with a plane in which the macroencapsulation device may generally extend. Further, in some embodiments, the two or more compartments may be coextensive with one another along substantially their entire transverse areas parallel to this plane. The embodiment shown in FIGS. 1A-1D is a three compartment device including a primary compartment 120, a secondary compartment 122, and a tertiary compartment 124. For the sake of clarity, a single group of compartments has been illustrated. However, it should be understood that macroencapsulation devices including multiple groups of associated compartments disposed in different portions of a macroencapsulation device are also contemplated as the disclosure is not limited to a device in which a single group of compartments extending over an entire surface area of the device is used. The specific arrangement of the membranes and these compartments is described further below.

As illustrated in the figures, the macroencapsulation device 100 may include a first outer membrane 102, a second outer membrane 104, a first semipermeable membrane 116, and a second semipermeable membrane 118. The device may also include a primary compartment 120, a secondary compartment 122, and a tertiary compartment 124. In the depicted embodiment, the first semipermeable membrane is disposed against the first outer membrane, the second semipermeable membrane is disposed against the first semipermeable membrane opposite the first outer membrane, and the second outer membrane is disposed against the second semipermeable membrane opposite the first outer membrane and the first semipermeable membrane. The various membranes may be bonded, and/or otherwise connected to each other using any of the previously noted bonding methods. Thus, the first semipermeable membrane may be attached between the first outer membrane and the second semipermeable membrane, and the second semipermeable membrane may be attached between the first semipermeable membrane and the second outer membrane. Further, the membranes may be appropriately shaped and arranged such that the first semipermeable membrane and the first outer membrane form a primary compartment between opposing surfaces of the first semipermeable membrane and the first outer membrane. Correspondingly, the second semipermeable membrane and the second outer membrane may cooperate to form the secondary compartment between opposing surfaces of the second semipermeable membrane and the second outer member. The first semipermeable membrane and the second semipermeable membrane may also form the tertiary compartment between opposing surfaces of the first and second semipermeable membranes.

While single continuous membranes have been illustrated in the figures for the various membranes, in some embodiments, one or more of the first outer membrane 102, the second outer membrane 104, the first semipermeable membrane 116, and the second semipermeable membrane 118 may made from a plurality of connected membranes used to form an overall membrane.

In view of the above construction, the primary compartment 120 and the secondary compartment 122 may be separated by the first semipermeable membrane 116. Similarly, the tertiary compartment 124 and the secondary compartment 122 may be separated by the second semipermeable membrane 118. Thus, in embodiments in which three compartments are used, the secondary compartment is disposed between the primary compartment and the tertiary compartments. Further, the primary, secondary, and/or tertiary compartments may be coextensive with one another over at least over a portion, and in some embodiments substantially all, of their cross-sectional area relative to a transverse plane parallel to a plane in which the overall macroencapsulation device extends. Due to the first and second semipermeable membranes being located within the interior of the device being configured to be permeable to at least some materials such as a filtrate and/or ancillary agent, the primary compartment may be in fluid communication with the secondary compartment through the first semipermeable membrane and the secondary compartment and the tertiary compartment may be in fluid communication through the second semipermeable membrane.

As noted previously, in some embodiments, a macroencapsulation device 100 may include a plurality of through holes 114 distributed across a planar surface of the device. The through holes may extend from a first exterior surface of the macroencapsulation device to an opposing exterior surface of the macroencapsulation device which in the depicted embodiment may correspond to the through holes extending from an exterior surface of the first outer membrane 102 to an opposing exterior surface of the second outer membrane 104. The through holes may be surrounded by corresponding bonded portions 110. The bonded portions may include bonded portions of the first and second outer membranes, as well as any intermediate interior membranes positioned between the outer membranes such as the first and second semipermeable membranes 116 and 118. The bonded portion surrounding each through hole may form a seal between the interior of the device and the through holes. The use of these through holes may allow for more cells per unit area as compared to a device with a flat configuration since the cells may be provided with increased amounts of nutrients throughout the matrix to support their viability and activity. Specifically, when implanted in vivo, the through holes may allow for vasculature to grow around the device and through the through holes. In contrast, a typical device without through holes is limited to vasculature forming on the top and bottom surfaces of the device. The maximum transverse dimension, such as a diameter, of the through holes may be measured at its narrowest point in a transverse plane parallel to a transverse plane in which the maximum transverse dimension of the overall device extends. The size, number, and/or density of the through hole may be appropriately selected to provide a desired performance of the device when positioned in vivo.

In some embodiments, at least one of the primary compartment 120, the secondary compartment 122, and the tertiary compartment 124 may comprise a continuous compartment. Alternatively, at least one of the primary compartment 120, the secondary compartment 122, and the tertiary compartment 124 may comprise a plurality of continuous interconnected compartments which may have any appropriate shape. For example, the internal compartments shown in the figures correspond to a plurality of interconnected channels 112 corresponding to the internal volumes of the compartments disposed between adjacent bonded portions 110 of the membranes corresponding to the locations of the plurality of through holes 114 located on a face of the device. However, it should be understood that any appropriate arrangement and/or shape of interconnected volumes and/or a single continuous volume may be used for each of the internal compartments as the disclosure is not limited in this fashion.

In the above embodiment, the primary compartment 120, the tertiary compartment 124, or both may be configured to provide a volume for housing one or more population of cells which may either be the same or different from one another. Correspondingly, the secondary compartment 122 may be configured to remove a filtrate from the primary compartment, the secondary compartment, or both. The secondary compartment may also be configured to provide an ancillary agent to the primary compartment, the tertiary compartment, or both. Thus, in the depicted embodiment each of the first outer membrane 102, the second outer membrane 104, the first semipermeable membrane 116, and the second semipermeable 118 may be configured to block passage of the population of cells. The first semipermeable membrane may also be configured to allow a filtrate to pass from the primary compartment to the secondary compartment. Similarly, the second semipermeable membrane may be configured to allow a filtrate to pass from the tertiary compartment to the secondary compartment. The first and/or second semipermeable membranes may also be configured to allow an ancillary agent to pass from the tertiary compartment to the primary and tertiary compartments respectively.

Figure 1B:
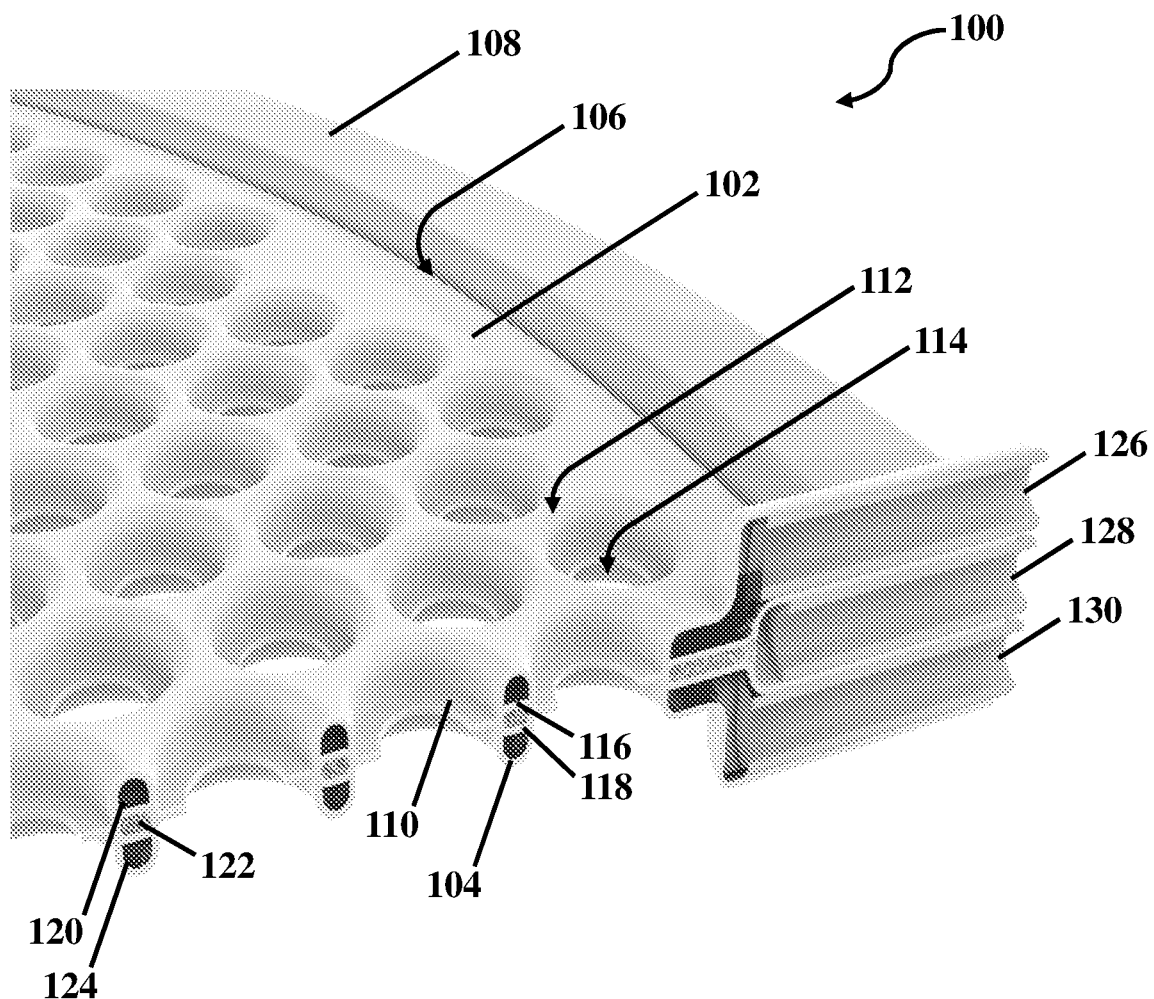
FIG. 1B shows a perspective cross-sectional view of the macroencapsulation device of FIG. 1A.
Figure 1C:
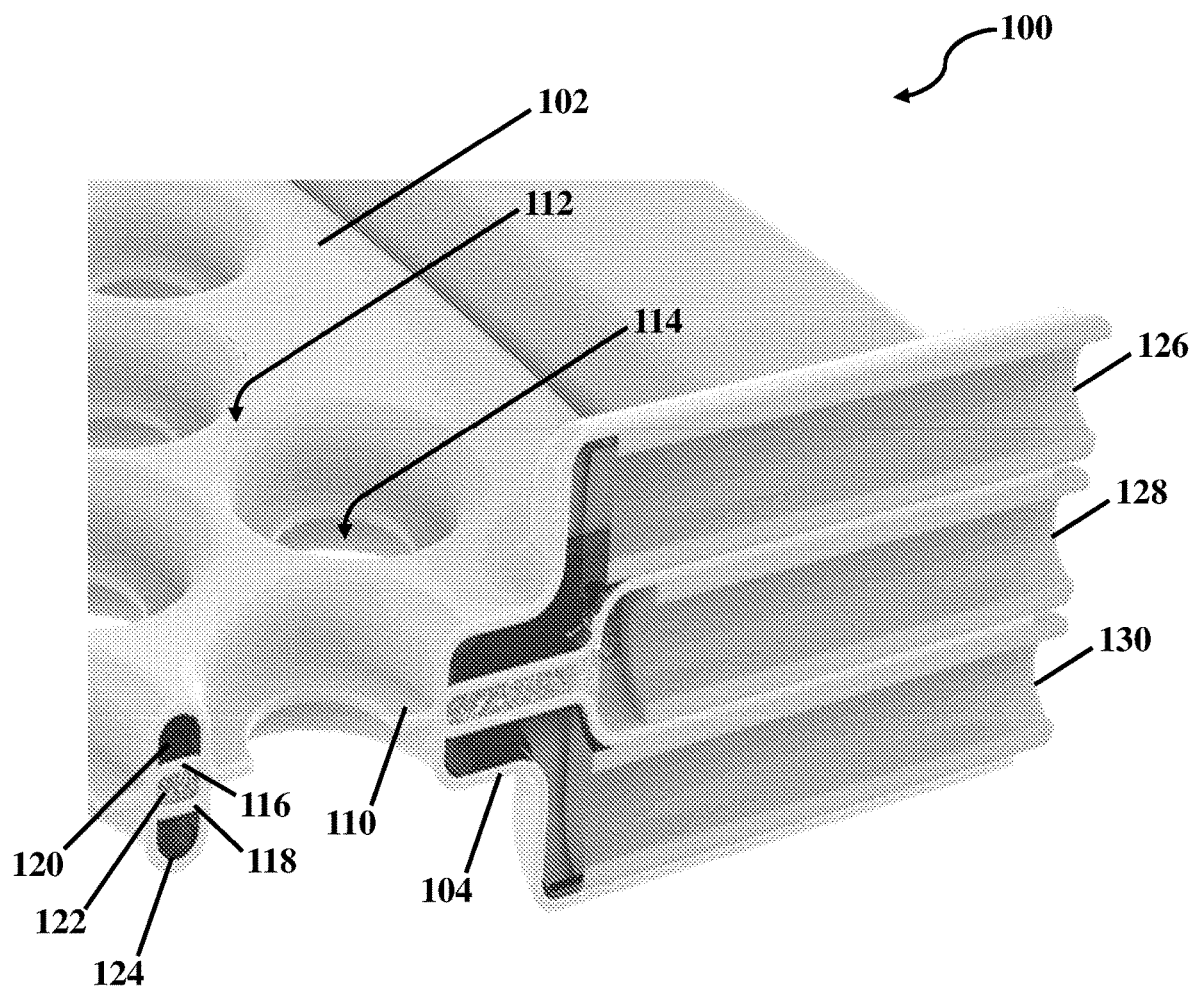
FIG. 1C shows a perspective cross-sectional view of the ports of the macroencapsulation device of FIG. 1A.
Figure 1D:
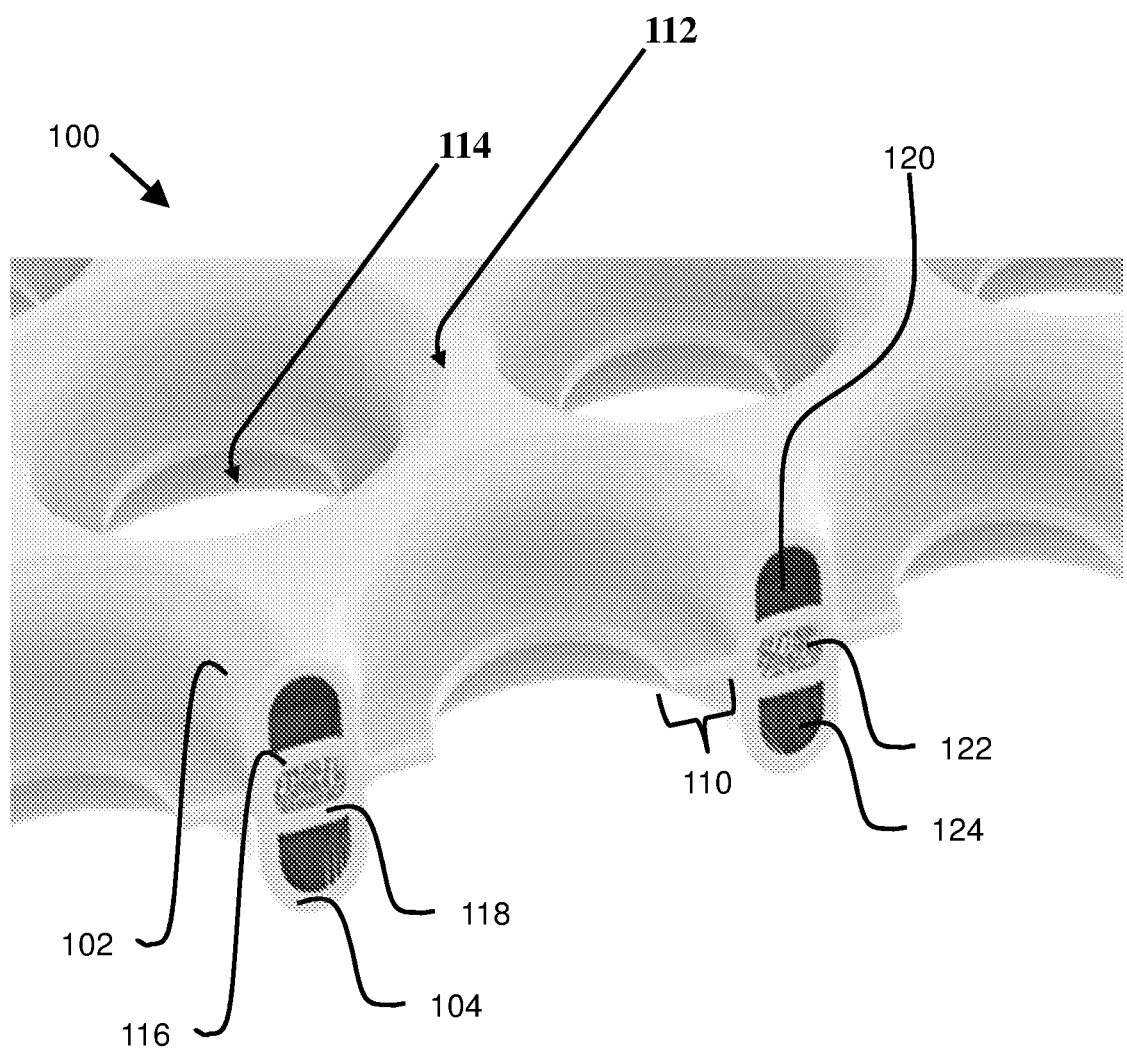
FIG. 1D shows a perspective cross-sectional view of membrane layers of the macroencapsulation device of FIG. 1A.

As also shown in FIGS. 1A-1B, a macroencapsulation device 100 may also include at least one port that provides fluid communication between an exterior of the device and the one or more compartments contained therein. For instance, a primary port 126 may be in fluid communication with the primary compartment 120, a secondary port 128 may be in fluid communication with the secondary compartment 122, and a tertiary port 130 may be in fluid communication with the tertiary compartment 124. In some embodiments, at least one of, and in some instances each of, the primary, the secondary, and the tertiary port may be sealable or resealable to provide selective fluid communication between the associated interior compartment and an exterior of the macroencapsulation device. The primary port, the secondary port, the tertiary port, or any combination thereof may be configured to enable percutaneous access. In either case, the various ports may provide access to the associated interior compartments of the device such that a population of cells may be introduced into an associated compartment, a filtrate may be removed from an associated compartment, and/or an ancillary agent may be introduced into an associated compartment through one or more of the ports as described further below.

While an embodiment has been illustrated in the figures in which ports have been used, the disclosure is not limited to macroencapsulation devices including ports. For example, embodiments of a macroencapsulation device that may be fully sealed without the use of a primary, secondary port, or tertiary port are also contemplated.

Figure 2A:
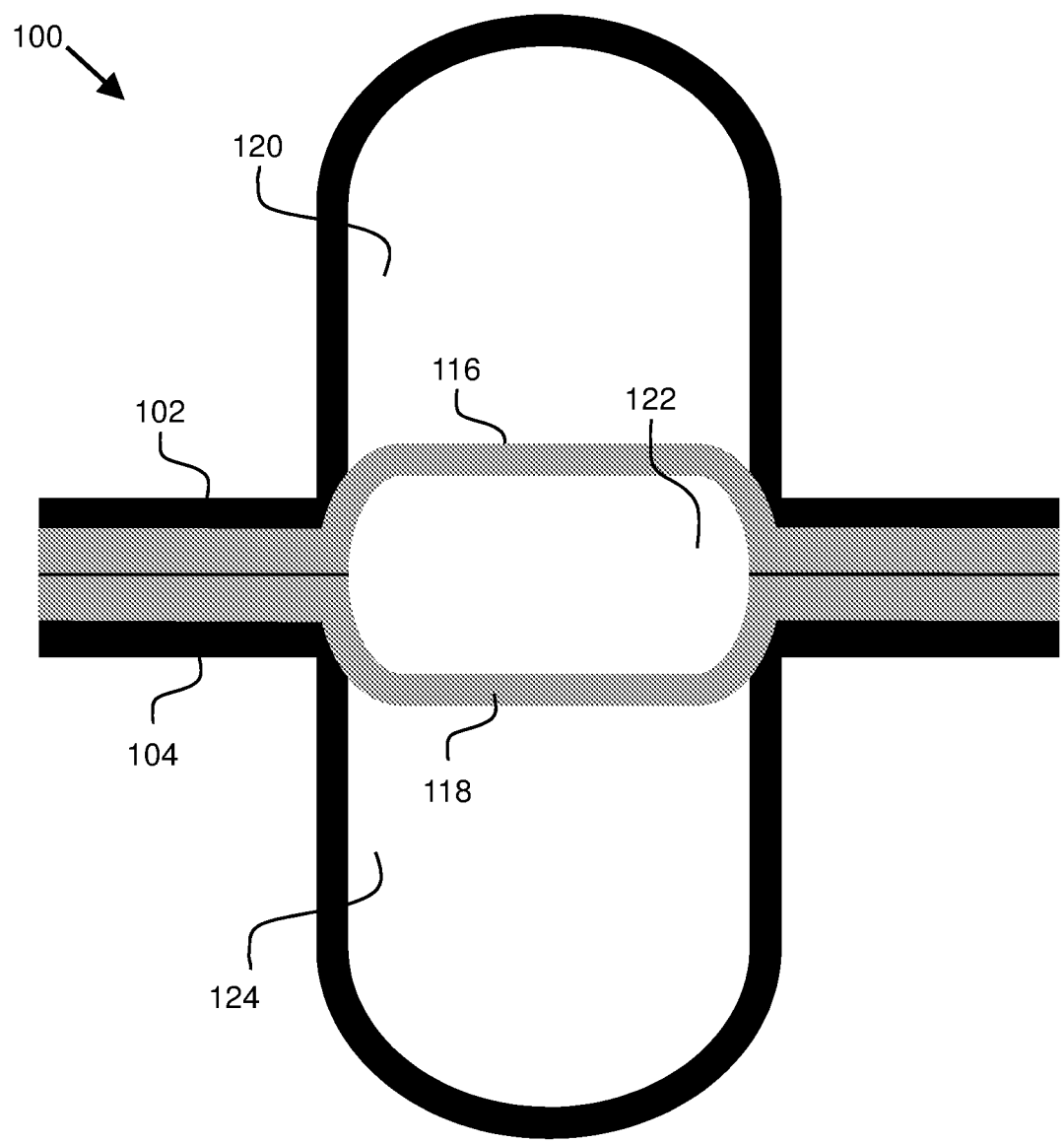
FIG. 2A shows a cross-sectional schematic of a macroencapsulation device including three internal compartments according to some embodiments.
Figure 2B:
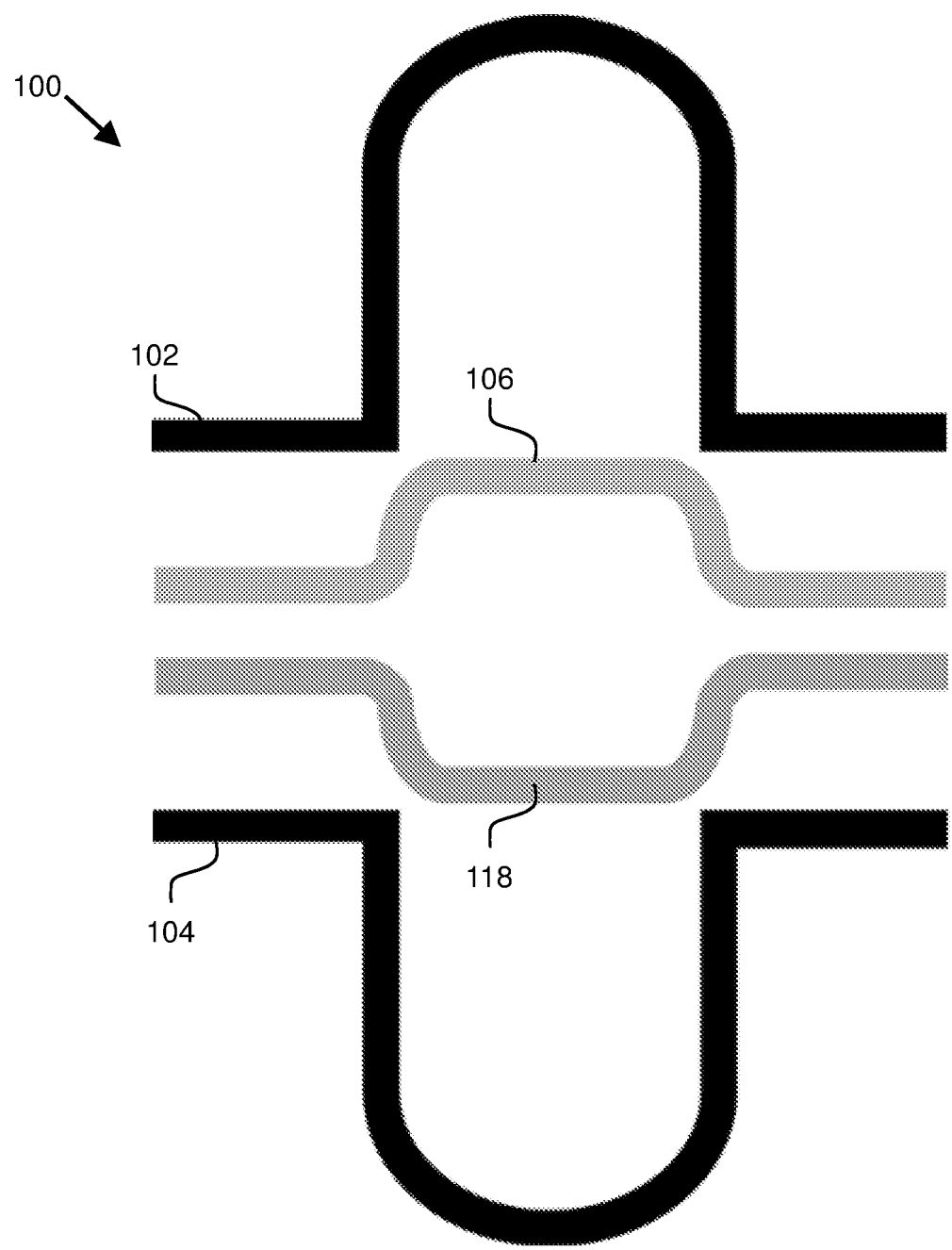
FIG. 2B shows an exploded cross-sectional schematic of the macroencapsulation device of FIG. 2A.
Figure 3:
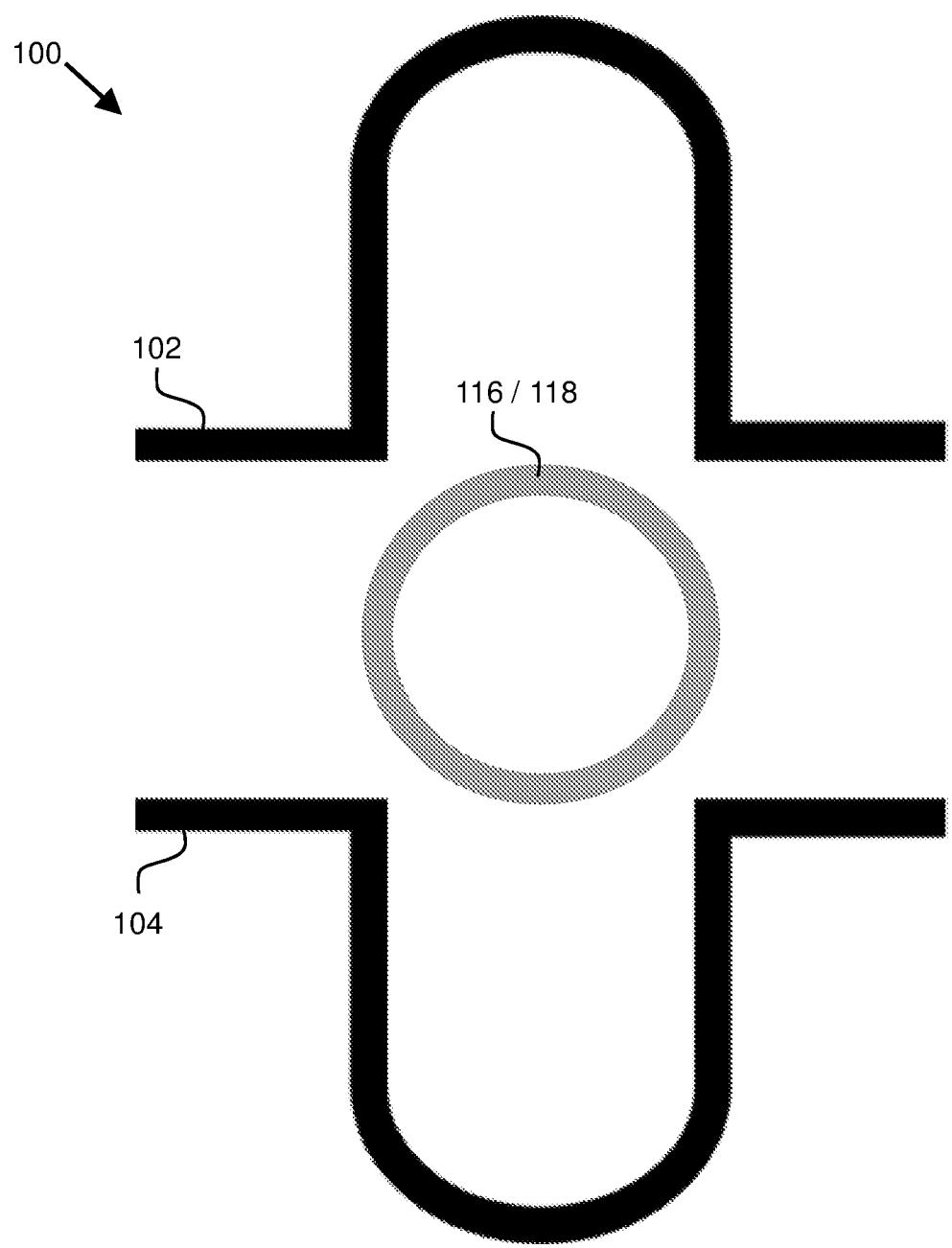
FIG. 3 shows an exploded cross-sectional schematic of a macroencapsulation device including three internal compartments according to some embodiments.

FIGS. 2A-2B show a simplified schematic diagram and an exploded schematic diagram of a macroencapsulation device 100 including first and second outer membranes 102 and 104 with first and second semipermeable membranes disposed there between. As described previously, the membranes and the interior semipermeable membranes may be appropriately arranged and bonded to one another to form the previously described primary compartment 120, secondary compartment 122, and tertiary compartment 124 within an interior of the device. Further, the planar stacked arrangement of each of these separate membranes within the bonded regions is clearly illustrated in the schematic figures. In an alternative embodiment, as shown in FIG. 3, the first and second semipermeable membranes disposed within the interior of the device may be formed as a single integral membrane. In the depicted embodiment, the semipermeable membrane is shaped as an elongated lumen that is disposed between the opposing first and second outer membranes. Thus, when the membranes are bonded together, an upper portion of the integral membrane adjacent to the first outer membrane may function as the first semipermeable membrane 116 and the lower portion of the integral membrane adjacent to the second outer membrane may function as the second semipermeable membrane number 118. Additionally, while separate first and second outer membranes have been illustrated in the figures, it should be understood that embodiments in which a single membrane that has been folded over to function as the first and second outer membranes are also contemplated.

Figure 4A:
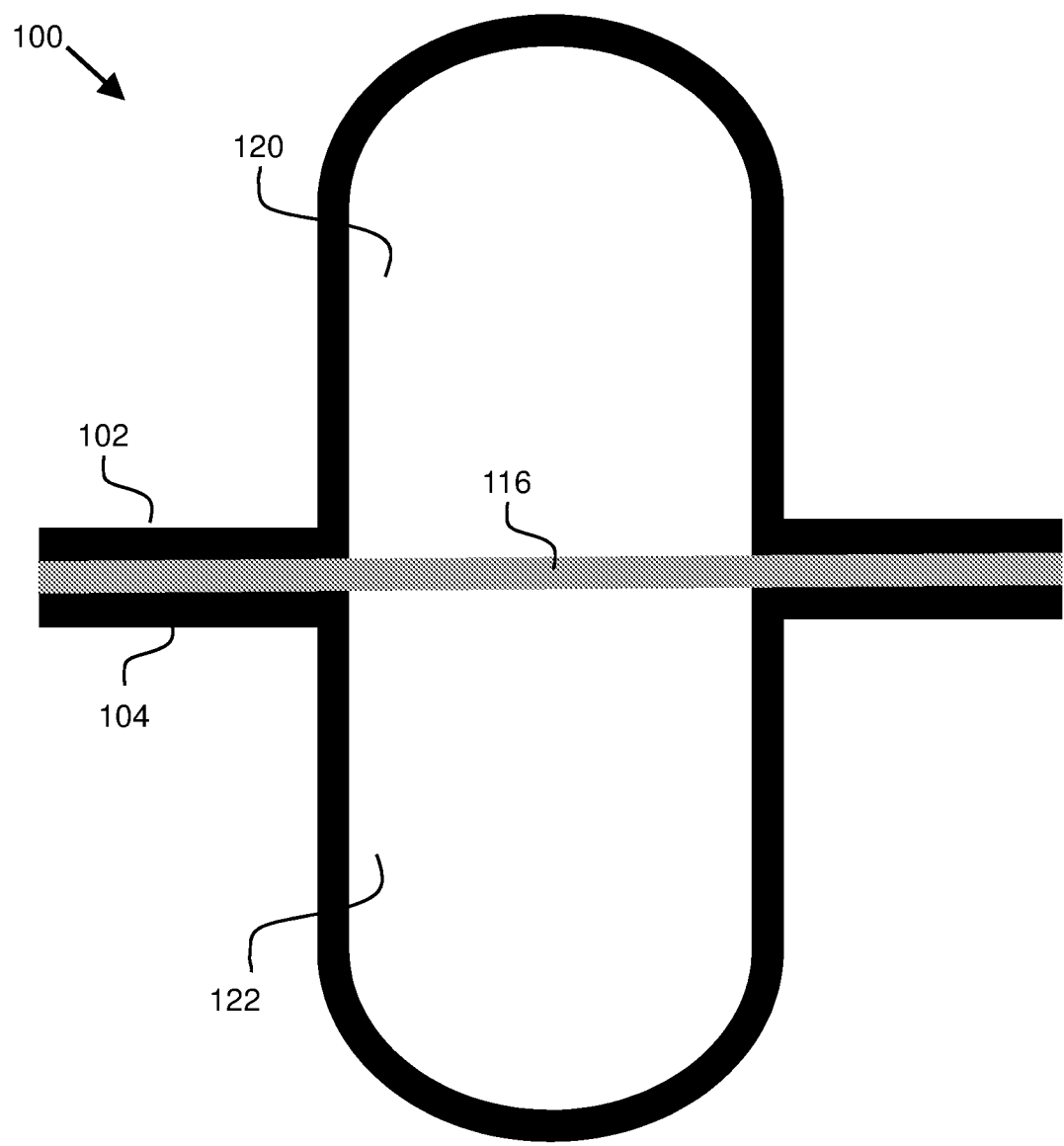
FIG. 4A shows a cross-sectional schematic of a macroencapsulation device including two internal compartments according to some embodiments.
Figure 4B:
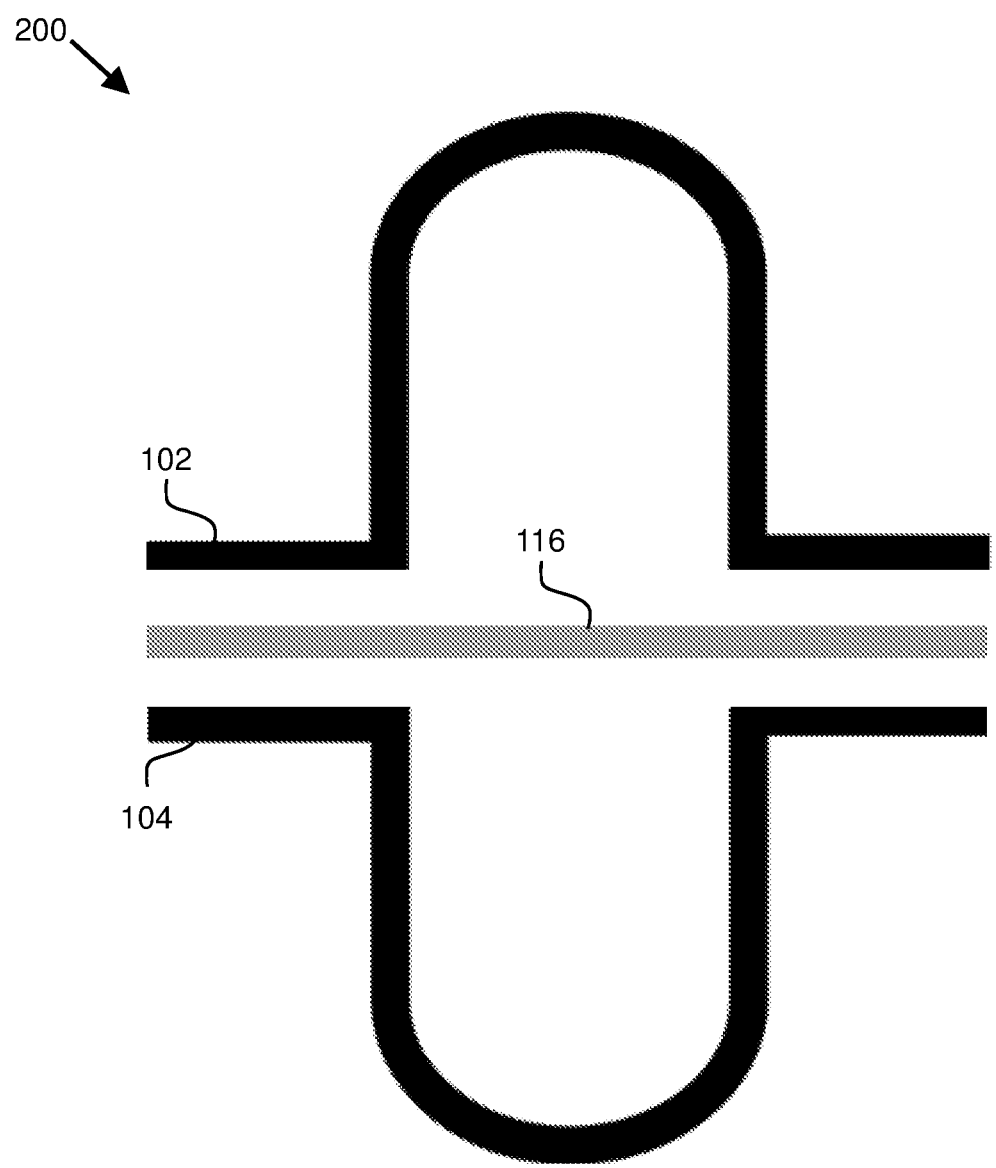
FIG. 4B shows an exploded cross-section schematic of the macroencapsulation device of FIG. 3A.

While the above embodiment includes three compartments, in some embodiments, the macroencapsulation device 100 may not include a second semipermeable membrane 118. In such an embodiment, the device may only include a primary compartment and a corresponding secondary compartment. For example, in FIGS. 4A and 4B a macroencapsulation device 100 may be configured to encapsulate a population of cells as previously described. The device may include a first outer membrane 102, a second outer membrane 104, and a first semipermeable membrane 116 disposed between the first and second outer membranes. Thus, the first semipermeable membrane and the first outer membrane may form a primary compartment there between and the first semipermeable membrane and the second outer membrane may form the secondary compartment there between. Similar to the above described three compartment embodiment, the macroencapsulation device may include one or more ports, such as a primary and secondary port in fluid communication with the primary and secondary compartments respectively to provide fluid communication between an exterior of the device and the internal compartments. Again, these ports may be sealable or resealable in some embodiments.

The primary compartment 120 and the secondary compartment 122 may be separated from one another by the first semipermeable membrane 116 and may be fluid communication with one another through the first semipermeable membrane. In this embodiment, the primary compartment, the secondary compartment, or both may be configured to provide a volume for housing one or more populations of cells. Additionally, the secondary compartment may be configured to remove a filtrate from the primary compartment, provide an ancillary agent to the primary compartment, or both as previously described.

In view of the above, each of the first outer membrane 102, the second outer membrane 104, and the first semipermeable membrane 116 may be configured to block passage of the population of cells contained within the device. The first semipermeable membrane may also be configured to allow a filtrate to pass from the primary compartment 120 to the secondary compartment 122 through the first semipermeable membrane. Additionally, the first semipermeable membrane may be configured to allow an ancillary agent to pass from the secondary compartment to the primary compartment through the first semipermeable membrane as previously described.

For the sake of clarity, a method for using a macroencapsulation device including three internal compartments (i.e. a primary compartment, a secondary compartment, and a tertiary compartment) is described relative to FIGS. 5A-5C. However, the methods and relative flow of materials described below are applicable to devices including two, three, four, or any number of compartments as the disclosure is not limited to the use of devices only including two or three associated compartments.

FIGS. 5A-5C depict a cross section of a macroencapsulation device 100 taken through a portion of the device including multiple through holes 114 similar to that described above relative to FIGS. 1A-1D. Thus, the macroencapsulation device may include first and second outer membranes 102 and 104 along with first and second semipermeable membranes 116 and 118 that cooperate to form a primary compartment 120, a secondary compartment 122, and a tertiary compartment 124. As elaborated on further below, use of the macroencapsulation device may include any appropriate combination of one or more of: implanting the device; pre-vascularizing the device to form microvasculature 132 extending around the device and/or through the through holes of the device; loading one or more populations of cells into the primary and/or tertiary compartments; applying a pressure differential between the secondary compartment and the first and/or tertiary compartments to remove a filtrate 136 from the primary and/or tertiary compartments; and loading an ancillary agent 138 into the secondary compartment which may then flow into the first and/or tertiary compartments.

As noted above, in some instances one or more populations of cells 134 may be loaded into the primary and/or tertiary compartments 120 and 124 after pre-vascularizing a macroencapsulation device 100, though instances in which a macroencapsulation device is used without pre-vascularization are also contemplated. As shown in FIG. 5A, pre-vascularizing the device may be performed by implanting the device for a predetermined vascularization period during which microvasculature may grow around the device and/or through the through holes 114. The vascularization period may be greater than or equal to 1 day, 2 days, 3 days, 4 days, 5 days, 6 days, 7 days, 8 days, 9 days, 10 days, or any other appropriate time period. The vascularization period may also be less than or equal to 10 weeks, 9 weeks, 8 weeks, 7 weeks, 6 weeks, 5 weeks, 4 weeks, 3 weeks, 2 weeks, 1 week, and/or any other appropriate time period. Combinations of the foregoing are contemplated including, for example, a vascularization period that is between or equal to 1 day and 10 weeks. Of course vascularization periods both greater than and less than those noted above are contemplated as the disclosure is not limited in this fashion.

In some instances it may be beneficial to inflate the compartments of a device during a vascularization period to maintain the compartments in a desired expanded configuration. Thus, during prevascularization of a macroencapsulation device, the primary compartment 120, the secondary compartment 122, the tertiary compartment 124, or any combination thereof may be inflated. For example, a fluid may be flowed into the primary, secondary, and/or tertiary compartments through one or more associated ports, not shown. Appropriate fluids that may be used to inflate the compartments may include any appropriate biologically compatible fluid. In some embodiments, the fluid may be capable of being retained in the interior of the device based on the corresponding properties of the exterior membranes and/or the internal semipermeable membranes which may be configured to retain the fluid within an interior of the device. Several examples of appropriate fluids for inflating the compartments may include, but are not limited to, oxygen, saline, cell culture media, alginate, chitosan, dextrose, perfluorocarbons, and combinations thereof. Once inflated to a desired pressure, volume, and/or other appropriate parameter, the ports associated with the primary, secondary, and tertiary compartments may be sealed to maintain the associated compartments in the desired inflated configuration during vascularization of the device. After vascularization, the ports may be reopened and the fluid used to inflate the compartments may be removed in any appropriate fashion.

As described previously, in some embodiments, at least one of the primary compartment 120 and the tertiary compartment 124 may be configured to house, and retain therein, one or more cell populations 134. Again, the primary compartment and the secondary compartment 122 may can be separated by the first semipermeable membrane 116. Similarly, the secondary compartment and the tertiary compartment may be separated by the second semipermeable membrane 118. The first and second semipermeable membranes may be configured to filter a filtrate 136 from the primary compartment and/or tertiary compartments. Thus, when the cell populations are loaded into the primary and/or tertiary compartments, a filtrate 136 that is combined with the cell populations during loading may flow from the primary and/or tertiary compartments through the associated first and/or second semipermeable membranes into the secondary compartment. The flow of material into the secondary compartment may be aided by a pressure differential applied between the secondary compartment and at least one, or both, of the primary and tertiary compartments. This pressure differential may be provided using either suction applied to the secondary compartment, an increase in pressure due to flow of material into the primary and/or tertiary compartments, a combination of the foregoing, and/or any other appropriate method of applying a bias to cause the filtrate to flow into the secondary compartment. Additionally, in some embodiments, the filtrate may either be removed during the loading process and/or subsequent to the loading process through an associated port, not depicted. This loading of the cells and removal of the filtrate may be done percutaneously though the disclosure is not limited to only removing the filtrate through a percutaneously accessible port. Again while a three compartments device has been depicted in the figures, the above-noted method may also be applied to devices including either two compartments and/or any other appropriate number of compartments as the disclosure is not limited in this fashion.

After loading the desired cell populations 134 into a macroencapsulation device 100 and/or removing a filtrate 136, an ancillary agent 138 may be provided to the one or more cell populations which may be disposed within the primary compartment 120 and/or the tertiary compartment 124. For example, the ancillary agent may be introduced into the secondary compartment 122 through an associated port, not depicted. The ancillary agent may then flow from the secondary compartment into the primary compartment and/or the tertiary compartment through the associated first and second semipermeable membranes 116 and 118. The flow of the ancillary agent into the primary and tertiary compartments from the secondary compartment may either be due to diffusion from a concentration gradient between the adjacent compartments and/or from a pressure differential between adjacent compartments due to the flow of ancillary agent into the secondary compartment. Similar to removal of the filtrate, in some embodiments, the ancillary agent 138 may be loaded into the secondary compartment percutaneously though other methods of introducing the ancillary agent are also contemplated. In one specific embodiment, providing the ancillary agent may be performed by connecting an indwelling tubing with a subcutaneously located port of the secondary compartment and flowing the ancillary agent through the port into the secondary compartment and then into the primary and secondary compartments. The subcutaneously placed port may comprise a vascular access port. Of course, embodiments in which an ancillary agent is directly loaded into the primary and/or tertiary compartments through one or more associated ports are also contemplated. As noted previously, the ancillary agent may comprise an anti-inflammatory drug, an oxygen generating substance, a differentiation factor, an anti-coagulation factor, nutrients, any combination thereof, and/or any other appropriate agent as the disclosure is not limited in this fashion.

In the above embodiment, the ancillary agent may either be provided once or multiple times at periodic intervals. The periodic intervals in which the ancillary agent may be provided to the cells via the secondary compartment may be greater than or equal to 1 minute, 2 minutes, 5 minutes, 10 minutes, 20 minutes, 30 minutes, 1 hour, 2 hours, 5 hours, 10 hours, 1 day, 2 days, 5 days, and/or any other proper time interval. Correspondingly, the time interval between applications of the ancillary agent may be less than or equal to 60 weeks, 50 weeks, 20 weeks, 10 weeks, 5 weeks, 1 week, 5 days, 2 days 1 day, and/or any other appropriate time interval. Combinations of the foregoing ranges are contemplated including, for example, a time interval that is between or equal to 1 minute and 60 weeks. Of course time intervals both greater than and less than those noted above are also contemplated as the disclosure is not limited in this fashion.

As noted above, in some embodiments, a pressure differential may be applied between two or more of the compartments of a macroencapsulation device 100 to facilitate one or more of: flowing cells into a compartment; flowing a filtrate and/or ancillary agent between compartments; flowing a filtrate out of a port of a compartment; and/or flowing an ancillary agent through a port and into an associated compartment. For example, a pressure differential may be applied between the secondary compartment 122 and one or both of the primary compartment 120 and tertiary compartment 124 to remove the filtrate 138 from the primary and tertiary compartments after pre-vascularizing the device. Applying the pressure differential between the secondary compartment and the primary and/or tertiary compartments may be done either simultaneously with or after the loading of the cell populations 134. Additionally, negative and/or positive pressures may be applied to the associated compartments to generate the desired pressure differential. For example, a suction or vacuum may be applied to a compartment, material may flow into another compartment to increase a pressure within that compartment, a combination of the above, and/or any other appropriate method may be used to generate a desired pressure differential as the disclosure is not so limited. Further, in some instances a concentration gradient may be used to induce a flow of material between compartments. For instance, a large concentration of an ancillary agent may be disposed within a secondary compartment which may then diffuse into the other adjacent compartments which may have a lower concentration of the ancillary agent.

While any appropriate pressure differential may be applied to generate a desired flow of material within various portions of a macroencapsulation device, in some embodiments, a pressure differential applied between two adjacent compartments may be greater than or equal to about 1 atm, 1.25 atm, 1.3 atm, 1.35 atm, 1.4 atm, 1.45 atm, 1.5 atm, and/or any other appropriate pressure differential. Correspondingly, the pressure differential may be less than or equal to 3 atm, 2.75 atm, 2.5 atm, 2.25 atm, 2 atm, 1.9 atm, 1.8 atm, 1.6 atm, and/or another appropriate pressure differential. Combinations of the above noted ranges are contemplated including, for example, a pressure differential that is between or equal to about 1 atm and 3 atm. Of course it should be understood that any appropriate pressure differential, including pressure differentials both greater than and less than those noted above, may be used depending on the particular application.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A macroencapsulation device comprising:
   a first outer membrane;
   a second outer membrane;
   a first semipermeable membrane disposed between the first outer membrane and the second outer membrane;
   a primary compartment formed by the first semipermeable membrane and the first outer membrane, wherein the primary compartment is configured to house a first population of cells;
   a second semipermeable membrane disposed between the first semipermeable membrane and the second outer membrane;
   a secondary compartment formed by the first semipermeable membrane and the second semipermeable membrane, wherein the primary compartment and the secondary compartment are in fluid communication through the first semipermeable membrane; and
   a tertiary compartment disposed between the second semipermeable membrane and the second outer membrane, wherein an interior volume of at least one selected from the primary compartment, the secondary compartment, and the tertiary compartment is subdivided into a plurality of continuous interconnected channels.

2. The macroencapsulation device of claim 1, wherein the first semipermeable membrane is configured to block passage of the first population of cells between the primary and secondary compartments and permit flow of a filtrate and/or an ancillary agent between the primary compartment and the secondary compartment.

3. The macroencapsulation device of claim 1, further comprising the first population of cells disposed in the primary compartment.

4. The macroencapsulation device of claim 1, wherein the first and second outer membranes are configured to block passage of the first population of cells out of the device.

5. The macroencapsulation device of claim 1, wherein the first and/or second outer membrane are semipermeable.

6. The macroencapsulation device of claim 1, wherein a hydraulic permeability and/or a porosity of the first semipermeable membrane is different from a hydraulic permeability and/or a porosity of the second semipermeable membrane.

7. The macroencapsulation device of claim 1, wherein the tertiary compartment is configured to house a second population of cells.

8. The macroencapsulation device of claim 7, further comprising the first population of cells disposed in the primary compartment and the second populations of cells disposed in the tertiary compartment, and wherein the first and second populations of cells include different types of cells.

9. The macroencapsulation device of claim 1, wherein a hydraulic permeability and/or a porosity of the first semipermeable membrane is different than a hydraulic permeability and/or a porosity of the first and/or second outer membranes.

10. The macroencapsulation device of claim 1, further comprising a primary port in fluid communication with the primary compartment and a secondary port in fluid communication with the secondary compartment.

11. The macroencapsulation device of claim 10, wherein the primary port and the secondary port are sealable or resealable.

12. The macroencapsulation device of claim 1, further comprising a plurality of bonded portions, wherein the plurality of continuous interconnected channels are disposed between adjacent bonded portions of the plurality of bonded portions.

13. The macroencapsulation device of claim 12, wherein the plurality of bonded portions are formed with the first outer membrane, the second outer membrane, the first semipermeable membrane, and the second semipermeable membrane.

14. The macroencapsulation device of claim 13, further comprising at least one through hole formed in the plurality of bonded portions.

15. The macroencapsulation device of claim 1, wherein the primary compartment, the secondary compartment and the tertiary compartment are subdivided into the plurality of continuous interconnected channels.

16. The macroencapsulation device of claim 15, wherein the primary compartment, the secondary compartment and the tertiary compartment are coextensive along substantially their entire transverse area parallel to a plane in which the macroencapsulation device generally extends.

17. A macroencapsulation device comprising:
a primary compartment configured to house a first population of cells;
a secondary compartment, wherein the primary compartment and the secondary compartment are in fluid communication through a first semipermeable membrane disposed between the primary compartment and the secondary compartment; and
a tertiary compartment, wherein the secondary compartment is disposed between the primary compartment and the tertiary compartment, wherein the tertiary compartment and the secondary compartment are in fluid communication through a second semipermeable membrane disposed between the secondary compartment and the tertiary compartment, and wherein an interior volume of at least one selected from the primary compartment, the secondary compartment, and the tertiary compartment is subdivided into a plurality of continuous interconnected channels.

18. The macroencapsulation device of claim 17, wherein the first semipermeable membrane is configured to block passage of the first population of cells between the primary and secondary compartments and permit flow of a filtrate and/or an ancillary agent between the primary compartment and the secondary compartment.

19. The macroencapsulation device of claim 17, further comprising the first population of cells disposed in the primary compartment.

20. The macroencapsulation device of claim 17, wherein a hydraulic permeability and/or a porosity of the first semipermeable membrane is different from a hydraulic permeability and/or a porosity of the second semipermeable membrane.

21. The macroencapsulation device of claim 17, wherein the tertiary compartment is configured to house a second population of cells.

22. The macroencapsulation device of claim 21, further comprising the first population of cells disposed in the primary compartment and the second populations of cells disposed in the tertiary compartment, and wherein the first and second populations of cells include different types of cells.

23. The macroencapsulation device of claim 17, further comprising a primary port in fluid communication with the primary compartment and a secondary port in fluid communication with the secondary compartment.

24. The macroencapsulation device of claim 23, wherein the primary port and the secondary port are sealable or resealable.

25. The macroencapsulation device of claim 17, wherein the primary compartment, the secondary compartment and the tertiary compartment are subdivided into the plurality of continuous interconnected channels.

26. The macroencapsulation device of claim 17, further comprising a plurality of bonded portions, wherein the plurality of continuous interconnected channels are disposed between adjacent bonded portions of the plurality of bonded portions.

27. A macroencapsulation device comprising:
a first outer membrane;
a second outer membrane;
a first semipermeable membrane disposed between the first outer membrane and the second outer membrane;
a primary compartment disposed between the first semipermeable membrane and the first outer membrane, wherein the primary compartment is configured to house a first population of cells; and
a secondary compartment disposed between the first semipermeable membrane and the second outer membrane, wherein an interior volume of the primary compartment and an interior volume of the secondary compartment are coextensive and in fluid communication through the first semipermeable membrane, and
wherein the interior volume of the primary compartment and/or the interior volume of the secondary compartment is subdivided into a plurality of continuous interconnected channels.

28. The macroencapsulation device of claim 27, wherein the primary compartment and the secondary compartment are subdivided into the plurality of continuous interconnected channels.

29. The macroencapsulation device of claim 28, wherein the primary compartment and the secondary compartment are coextensive along substantially their entire transverse area parallel to a plane in which the macroencapsulation device generally extends.

* * * * *